US008369881B2

(12) United States Patent
Dei et al.

(10) Patent No.: US 8,369,881 B2
(45) Date of Patent: Feb. 5, 2013

(54) PTT SERVER, PTT COMMUNICATION SYSTEM, PTT COMMUNICATION METHOD, AND PROGRAM

(75) Inventors: Hiroaki Dei, Tokyo (JP); Kazuteru Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 878 days.

(21) Appl. No.: 12/517,536

(22) PCT Filed: Nov. 27, 2007

(86) PCT No.: PCT/JP2007/073280
§ 371 (c)(1),
(2), (4) Date: Jun. 3, 2009

(87) PCT Pub. No.: WO2008/069160
PCT Pub. Date: Jun. 12, 2008

(65) Prior Publication Data
US 2010/0022265 A1    Jan. 28, 2010

(30) Foreign Application Priority Data
Dec. 6, 2006    (JP) .................................. 2006-329749

(51) Int. Cl.
*H04B 7/00*    (2006.01)
(52) U.S. Cl. ........................................ 455/518; 455/3.06
(58) Field of Classification Search ................... 455/518, 455/519, 416, 414.4, 74; 370/260
See application file for complete search history.

(56) References Cited

U.S. PATENT DOCUMENTS
2006/0045363 A1* 3/2006 Dei et al. ....................... 382/232
2007/0177602 A1* 8/2007 Pichelin et al. ............ 370/395.2

FOREIGN PATENT DOCUMENTS

| JP | 1995107461 A | 4/1995 |
|----|--------------|--------|
| JP | 2004072375 A | 3/2004 |
| JP | 2004120415 A | 4/2004 |
| JP | 2005094800 A | 4/2005 |
| JP | 2006067124 A | 3/2006 |
| JP | 2006203682 A | 8/2006 |
| JP | 2006279715 A | 10/2006 |
| WO | 03102949 A | 12/2003 |

OTHER PUBLICATIONS

International Search Report for PCT/JP2007/073280 mailed Mar. 11, 2008.
M. Handley et al., "SIP: Session Initiation Protocol", Network Working Group, RFC 2543, Mar. 1999, Internet URL <http://www.ietf.org/rfc2543.txt>.
M. Handley et al., "SDP: Session Description Protocol", Network Working Group, RFC 4566, Jul. 2006, Internet URL <http://www.ietf.org/rfc/rfc4566.txt>.
H. Schulzrinne et al., "RTP: A Transport Protocol for Real-Time Applications", Network Working Group, RFC 3550, Jul. 2003, Internet URL <http://www.ietf.org/rfc/rfc3550.txt>.

* cited by examiner

*Primary Examiner* — Tu X Nguyen

(57) ABSTRACT

A PTT server includes a controlling unit, a receiving unit, a medium converting unit, and a transmitting unit. The controlling unit controls pieces of connection setting information less than the number of a plurality of PTT terminals having different specifications by complying them with the plurality of PTT terminals. The receiving unit receives a medium coded data from any one of the PTT terminals. The medium converting unit converts the medium coded data with a converting method on the basis of the connection setting information compliant with a PTT terminal for transmission destination to produce an output coded data. The transmitting unit transmits the output coded data to the PTT terminal for the transmission destination.

13 Claims, 13 Drawing Sheets

PTT SERVER, PTT COMMUNICATION SYSTEM, PTT COMMUNICATION METHOD, AND PROGRAM

This application is the National Phase of PCT/JP2007/073280, filed Nov. 27, 2007, which is based upon and claims the benefit of priority from Japanese patent application No. 2006-329749, filed on Dec. 6, 2006, the disclosure of which is incorporated herein in its entirely by reference.

TECHNICAL FIELD

This invention relates to a communication system and, in particular, to a PTT server, a PTT communication system, a PTT communication method, and a program which carry out transmission of data by PTT (Push To Talk) communications among terminals having different specifications (transmission protocols).

BACKGROUND ART

In recent years, a service for transmitting a speech coded data by PTT communications through a packet communication network is started. This is a communication form among terminals forming a group where the speech coded data from a terminal obtaining a right of statement is copied in a PTT server and is transmitted to another terminal participating in the group.

In a case where such PTT communication is carried out, a call connection processing is generally carried out by SIP (Session Initiation Protocol)/SDP (session Description Protocol) and a transmission destination of the coded data and information related to the coded data are notified from a PTT terminal to the PTT server. In addition, a medium coded data is transmitted and received with RTP (Real-time Transport Protocol) (see [Non-Patent Document 1] Handley, M., Schulzrinne, H., Schooler, E., Rosenberg, J., "SIP: Session Initiation Protocol", RFC 2543, March 1999, Internet URL <http://www.ietf.org/rfc2543.txt>, [Non-Patent Document 2] Handley, M., Jacobson, V., Perkins, C., "SDP: Session Description Protocol", RFC 4566, July 2006, Internet URL <http://www.ietf.org/rfc/rfc4566.txt>, and [Non-Patent Document 3] Schuizrinne, H., Casner, S., Fedrick, R., Jacobson, V., "RTP: A Transport Protocol for Real-Time Applications", RFC 3550, July 2003, Internet URL <http://www.ietf.org/rfc/rfc3550.txt>.

Under present circumstances, only a PTT service due to speech is started. However, with expanding a network band in the future, it is considered that a PTT service with a multimedia including video (picture) or image is developed and more fleshed information is exchanged between users.

However, in a case where specifications of PTT terminals are not uniform, although the PTT server copies the medium coded data transmitted from an individual terminal (a PTT terminal of a transmission source) to transmit another terminal participating in the group (a PTT terminal of a transmission destination), there is a possibility that the PTT terminal (the PTT terminal of the transmission destination) which cannot decode correctly exists. For example, if data is a speech coded data, there is a case that the PTT terminal where a coding method, a bit rate, and a mode to support are different exists in the group. In addition, if data is an image coded data, there is a case that the PTT terminal (the PTT terminal of the transmission source) that produces the image coded data having an image resolution and a frame rate which cannot decode by other PTT terminals (the PTT terminals of transmission destination) exists in the group. Although the PTT servers copies the speech coded data having a different coding method or the image code data that cannot decode due to a high image resolution to transmit them, the PTT terminal (PTT terminal of the transmission destination) receiving them cannot decode such a speech coded data or such an image coded data.

Furthermore, for example, attention will be directed to an image coding method such as MPEG (Moving Picture Experts Group)-4. It will be assumed that a coded data transmitted from a PTT server for transmission source has coding parameters such an image resolution, a frame rate, and a bit rate that are within the confines of the support in a PTT terminal for transmission destination. In addition, it will be assumed that the coded data transmitted from the PTT server for the transmission source has a coding tool such as data partitioning and reversible variable-length code that are different from specification of the PTT terminal for the transmission destination. In this event, the PTT terminal for the transmission destination may not decode received coded data. Likewise, it will be presumed that the received coded data has resolution of time information that is different from encoding specification obtained by call control processing. In this event, the PTT terminal for the transmission destination may not correctly decode the received coded data. This is because an image decoder generally initializes the coding tool and the time resolution to be used using information preliminarily obtained by call control. Similarly, as regards speech, when payload option is packed by option different from information obtained by the call control processing, the PTT terminal for the transmission destination may not correctly decompress the coded data.

Under the circumstances, it is necessary for the PTT server to convert a coding format, an image resolution, and so on of the coded data to be transmitted for each of PTT terminals having different coding specification and decoding ability. As a result, when the PTT server replies transmission of an image coded data, it results in increasing a processing amount required for conversion of the image coded data. In addition, in a tandem conversion serving as a general conversion, degradation of quality due to the conversion is not avoided.

On the other hand, Japanese Unexamined Patent Application Publication JP-A 2006-203682 (which corresponds to United States Patent Application Publication US 2006/0165180 A1), which will later be referred to as "a patent document 1", describes a method of reducing a computing amount and of maintaining quality of an image coding tool conversion and resolution conversion of time information. However, a congenially computing amount is required when the above-mentioned conversion processing is carried out for the respective PTT terminals. In addition, there is a possibility that the number of processing channels per PTT server is restricted.

In addition, Japanese Unexamined Patent Application Publication JP-A 2006-67124 (which corresponds to United States Patent Application Publication US 2006/0045363 A1), which will later be referred to as "a patent document 2", discloses a system which is capable of mutually transferring images among a plurality of clients even if coding methods, coding settings, coding options, or states of transmission path are different from each other.

Furthermore, Japanese Unexamined Patent Application Publication JP-A 2005-94800, which will later be referred to as "a patent document 3", discloses a moving picture re-encoding apparatus which has much flexibility in performing a special replay, an overlay processing and etc. that enable a digital connection between digital video systems employing different method, and which has high image quality and it at low cost.

In addition, WO2003/102949, which will later be referred to as "a patent document 4", discloses a data duplicate recording device which is capable, when data of a first recording medium is copied to recode in a second recording medium different from the first recording medium, of correctly reproducing data from the second recording medium. In the data duplicate recording device disclosed in the patent document 4, the data recorded in the first recording medium is a first coded data which is compression coded with a first coding method. The data duplicate recording device comprises a coding method judgment unit for judging whether or not the first coding method is a second coding method matched to the second recording medium, a coded data conversion unit for converting the first coded data read out of the first recording medium into a second coded data which is compression coded with the second coding method when judgment is made where the first coding method is not the second coding method, a recording unit for recording, in the second recording medium, the second coded data obtained by the coded data conversion unit.

DISCLOSURE OF INVENTION

It is an exemplary object of this invention to provide the PTT server, the PTT communication system, the PTT communication method, and the program, which are capable of reducing an amount of processing involved in conversion of a medium coded data for transmitting to a PTT terminal.

According to an exemplary aspect of this invention, a PTT (Push to Talk) server comprises a controlling unit for controlling pieces of connection setting information which are less in number than a plurality of PTT terminals having different specifications by complying them with the plurality of PTT terminals, a receiving unit for receiving an input medium coded data from any one of the plurality of PTT terminals, a medium converting unit for converting the input medium coded data with a conversion method on the basis of the connection setting information compliant with to a PTT terminal for a transmission destination into a converted data to produce the converted data as an output coded data, and a transmitting unit for transmitting the output coded data to the PTT terminal for the transmission destination.

According to another exemplary aspect of this invention, a PTT (Push to Talk) communication system comprises the above-mentioned PTT server, and a plurality of PTT terminals connected to the PTT server through a packet communication network.

According to still another exemplary aspect of this invention, a PTT (Push to Talk) communication method comprises (A) performing, in a controlling unit, call control for accommodating a plurality of PTT terminals as a PTT group to hold pieces of connection setting information less than the number of the plurality of PTT terminals with the connection setting information compliant with the plurality of PTT terminals, the connection setting information including information specifying coding setting information for an output coded data, the number of the connection setting information being less than the number of the PTT terminals, (B) receiving, in a receiving unit, an input medium coded data from any one of the plurality of PTT terminals, (C) converting, in a medium converting unit, the input medium coded data with a conversion method on the basis of the connection setting information compliant with a PTT terminal for a transmission destination into the output coded data, and (D) transmitting, from a transmitting unit, the output coded data to the PTT terminal for the transmission destination.

According to yet another exemplary aspect of this invention, a program is for making a computer realize the above-mentioned PTT communication method.

BEST MODE FOR CARRYING OUT OF THE INVENTION

Figure 1:
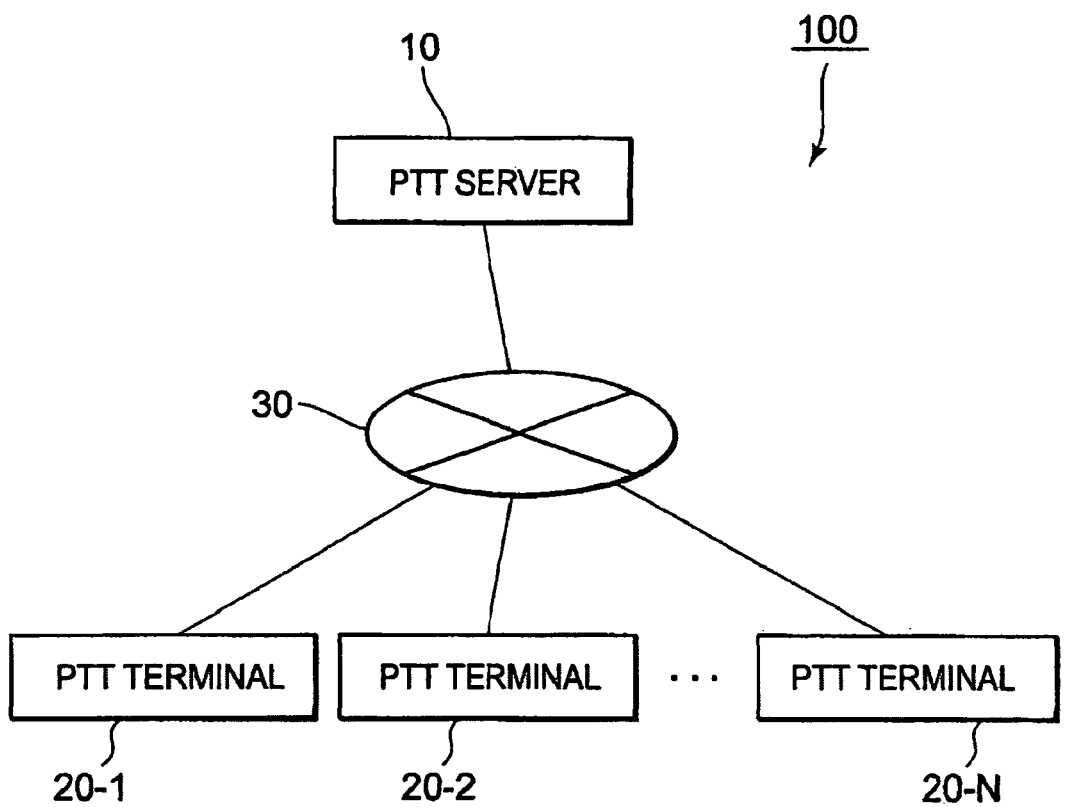
FIG. 1 is a view showing structure of a PTT communication system according to an exemplary embodiment of this invention.

Now, the description will be made as regards embodiments of a PTT server, a PTT communication system, a PTT communication method, and a program according to this invention with reference of attached drawings.

In the drawings, the same or similar reference symbols indicate the same, similar, equivalent constituent elements. In addition, the description will be omitted as regards the same or similar constituent elements.

Now, the PTT server, the PTT communication system, the PTT communication method, and the program will be described by exemplifying the PTT communication system 100 for carrying out PTT (Push To Talk) communications. In addition, although the description will be made by exemplifying an image coded data as a medium coded data transmitted in the PTT communication system 100 in those embodiments, the medium coded data is not restricted to them and may be a speech coded data or an image data.

First Exemplary Embodiment (Construction)

FIG. 1 is a block diagram showing construction of the PTT communication system 100 according to a first exemplary embodiment of this invention. The illustrated PTT communication system 100 comprises a PTT server 10 connected to a packet communication network 30 and first through N-th PTT terminals 20-1 to 20-N constituting of a PTT group that are accommodated in the PTT server 10 via the packet communication network 30, where N represents an integer which is not less than two.

The PTT server 10 comprises a computer unit which configures N PTT terminals 20-1 to 20-N as the PTT group by accommodating them and carries out a call connection processing for an n-th PTT terminal 20-$n$ which the PTT server gives a right of statement, where n represents a variable between 1 and N, both inclusive. Each of the first through the N-th PTT terminals 20-1 to 20-N comprises a communication terminal which is connected to the packet communication network 30 through a wireless line or a wired line. The n-th PTT terminal 20-$n$ may be, for example, a cellular telephone terminal or an IT telephone terminal.

The PTT terminal 10 and the n-th PTT terminal 20-$n$ are connected to the packet communication network 30 with IP (Internet Protocol) and carry out ability exchange using SIP (Session Initiation Protocol)/SDD (Session Description Protocol) as a call control processing. The n-th PTT terminal 20-$n$ carries out control of the right of statement to the PTT server 10 using TBCP (Talk Burst Control Protocol) or RTCP (RTP Control Protocol). In addition, the image coded data transmitted in the PTT communication system 100 is transmitted and received with RTP (Real-time Transport Protocol) packet. In addition, protocols for call control and the right of statement and a transmission protocol are not restricted to them.

Herein, among the first through the N-th PTT terminals 20-1 to 20-N, any one becomes a PTT terminal for a transmission source and another one except for the PTT terminal for the transmission source becomes a PTT terminal for a transmission destination. In addition, the PTT terminal of the transmission source is denoted by a j-th PTT terminal 20-$j$ while the PTT terminal of the transmission destination is denoted by an i-th PTT terminal 20-$i$, where j represents a variable satisfying $1 \leq j \leq N$ and i represents another variable satisfying $1 \leq i \leq N$ and $j \neq i$. In addition, on convenience of the description, the j-th PTT terminal 20-$j$ may be the n-th PTT terminal 20-$n$.

The PTT server 10 converts the image coded data received from the PTT terminal (the j-th PTT terminal) 20-$j$ for the transmission source into an image coded data corresponding to the PTT terminal (the i-th PTT terminal) 20-$i$ for the transmission destination and transmits it thereto. The PTT server 10 holds a conversion method corresponding to the PTT terminal (the i-th PTT terminal) 20-$i$ for the transmission destination as connection setting information 200 which will later be described and performs a conversion processing (a recoding processing) on the basis of the connection setting information 200 on replying the image coded data.

In order to participate in the PTT group, the n-th PTT terminal 20-$n$ carries out the ability exchange due to the SIP/SDP between the PTT server 10 and it. Herein, the "ability exchange" means a processing where the first through the N-th PTT terminals 20-1 to 20-N notify the PTT server 10 of a coding ability (e.g. a coding method, coding parameters, an image resolution, a coding tool, or the like) of the image coded data in the respective PTT terminals and the PTT server 10 notifies the first through the N-th PTT terminals 20-1 to 20-N in the PTT group of the connection setting information 200 in accordance with this notification.

The n-th PTT terminal 20-$n$ selects, with reference to the connection setting information 200 notified from the PTT server 10, one of outputs that is suitable to ability of its own terminal and establishes a transmission/reception session. In addition, it is possible to make ability of transmission/reception asymmetric by describing a=recvonly or a=sendonly and so on in SDP description.

Figure 2:
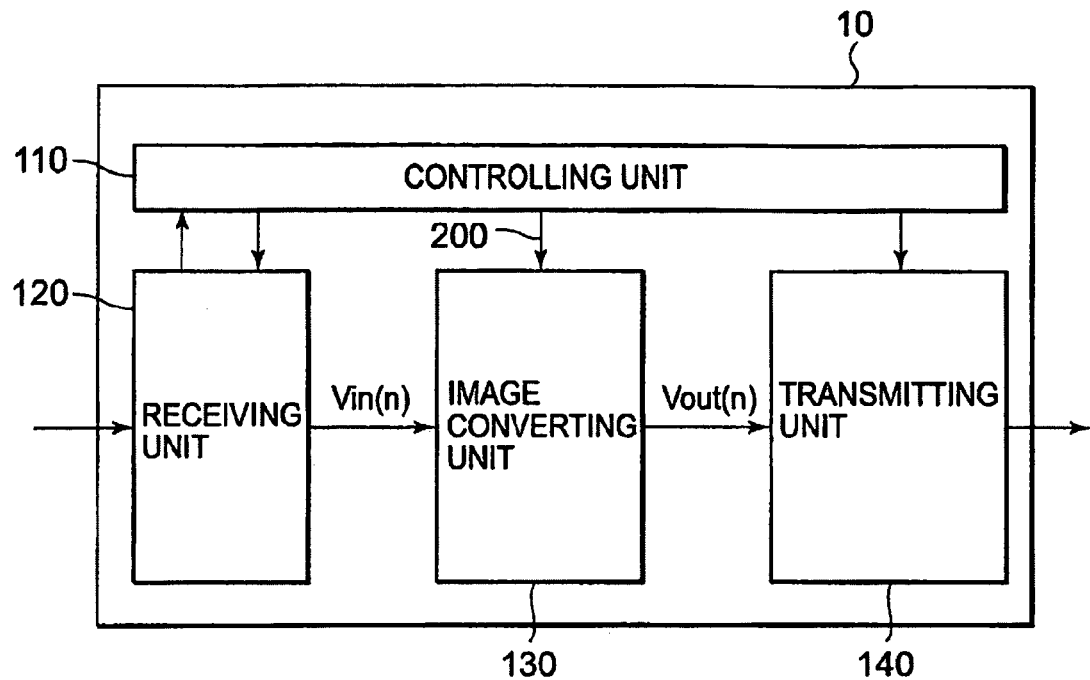
FIG. 2 is a block diagram showing structure of a PTT server according to a first exemplary embodiment of this invention.

Referring to FIG. 2, the construction of the PTT server 10 will be described in more detailed. The PTT server 10 comprises a controlling unit 110, a receiving unit 120, an image converting unit 130, and a transmitting unit 140. The image converting unit 130 is also called a medium converting unit. The controlling unit 110 carries out transmission/reception of various signals and data between the n-th PTT terminal 20-$n$ through the receiving unit 120 and the transmitting unit 140 and performs call control and control of the right of statement.

Specifically, the controlling unit 110 carries out participating and leaving processing of the n-th PTT terminal 20-$n$ in the PTT group using the SIP/SDP and carries out the control of the right of statement between the n-th PTT terminal 20-$n$ and it using the TBCP or the RTCP. In addition, the controlling unit 110 controls, as the connection setting information 200, coding setting information of a coded data Vout(n) which the PTT server 10 enables to produce. The coded data Vout(n) is also called an output coded data Vout(n). Herein, the output coded data Vout(n) will be also called an output signal Vout(n) hereunder. The coding setting information comprise, for example, a coding method, coding parameters, a coding tool, a time resolution, and so on.

On forming the PTT group, the controlling unit 110 selects the optimal connection setting information 200 to the respective PTT terminals on the basis of the coding ability of the PTT terminal notified from the first through the N-th PTT terminals 20-1 to 20-N through the receiving unit 120, respectively. And, the controlling unit 110 carries out the ability exchange with the call connection processing and complies with the PTT terminals. In addition, the controlling unit 110 controls the first through the N-th PTT terminals 20-1 to 20-N by complying with M pieces of the connection setting information 200 that are less in number to N, where M represents an integer which is not less than one. That is, $N > M \geq 1$.

Usually, there are a plurality of PTT terminals belonging to the PTT group that have the coding ability in common or near (for example, profiles or levels of the coded data are similar). There is a high possibility that such an n-th PTT terminal 20-$n$ selects the connection setting information 200 in common as a result of the call connection processing. Alternatively, the controlling unit 10 may describe, to the first through the N-th PTT terminals 20-1 to 20-N, all of the M pieces of the connection setting information 200 which the PTT server 10 produces in the SDP and the PTT terminal may carry out the ability exchange for selecting the coding ability suitable to its own terminal. In general, the PTT terminal can decode the coded data set in coding less than the ability of its own terminal and the PTT terminal can select the connection setting information 200 set in coding which is equal to or less than the ability of its own terminal. Therefore, the controlling unit 110 can comply the first through N-th PTT terminals 20-1 to 2-N with any of the M pieces of the connection setting information 200 that is less in number than the number N of the PTT terminals.

The receiving unit 120 comprises a plurality of receiving ports which are not shown in figures. The receiving unit 120 receives various signal or data from the n-th PTT terminal 20-n which is connected to any of the receiving ports and sends them to the controlling unit 110 and the image converting unit 130. The receiving unit 120 receives an image coded data from the n-th PTT terminal 20-n connected to the receiving port designated by the controlling unit 110 and delivers it as an input signal Vin(n) to the image converting unit 130. In addition, the receiving unit 120 may be a physical receiving module or a logical receiving session.

The image converting unit 130 converts the coding method and so on of the input signal Vin(n) on the basis of the connection setting information 200 obtained from the controlling unit 110 to generate the output signal Vout(n). More specifically, the image converting unit 130 first compares coding setting information of the input signal Vin(n) with the connection setting information 200 corresponding to the PTT terminal for the transmission destination. Herein, the coding setting information comprises, for example, a coding method, coding parameters, a coding tool, and so on. Subsequently, the image converting unit 130 converts, with a converting method determined on the basis of the comparison result, the input signal Vin(n) into the output signal Vout(n) to deliver the output signal Vout(n) to the transmitting unit 140. In addition, the controlling unit 110 acquires the coding setting information of the input signal Vin(n) on ability exchange in the call connection processing and determines the converting method using the coding setting information.

The transmitting unit 140 comprises a plurality of transmitting ports which are not shown in the figures. The transmitting ports normally share the receiving ports. The transmitting unit 140 transmits the output signal Vout(n) produced by the image converting unit 130 to any one (the i-th PTT terminal 20-i in this example) of the PTT terminals (the first through the N-th PTT terminals 20-1 to 20-N in this example) connected to the transmitting ports. In this event, the controlling unit 110 designates the transmitting unit 140 with a port number and an IP address of the PTT terminal (the i-th PTT terminal) 20-i for the transmission destination. When there are a plurality of output signals Vout(n) generated, the controlling unit 110 designates the transmitting unit 140 for the output signal Vout(n) corresponding to the PTT terminal (the i-th PTT terminal) 20-i for the transmission destination. The transmitting unit 140 transmits the designated output signal Vout(n) as the image coded signal to the corresponding PTT terminal (the i-th PTT terminal) 20-i. In addition, the transmitting unit 140 may be a physical transmitting module or a logical transmitting session.

In addition, the controlling unit 110 and the image converting unit 130 may be realized by a program which is executed by a computer. That is, the controlling unit 110 may comprise a control processor (not shown) and a memory device (not shown). In this event, the control processor carries out the above-mentioned control operation in accordance with a control program stored in the memory device. The image converting unit 130 may comprise an image converting processor (not shown) and a memory device (not shown). In this event, the image converting processor carries out the above-mentioned image converting operation in accordance with an image converting program stored in the memory device. Alternatively, the controlling unit 110 and the image converting unit 130 may comprise a processor (not shown) and a memory device (not shown). In this event, the processor carries out the above-mentioned control operation and the above-mentioned image converting operation in accordance with a program stored in the memory device.

Figure 3:
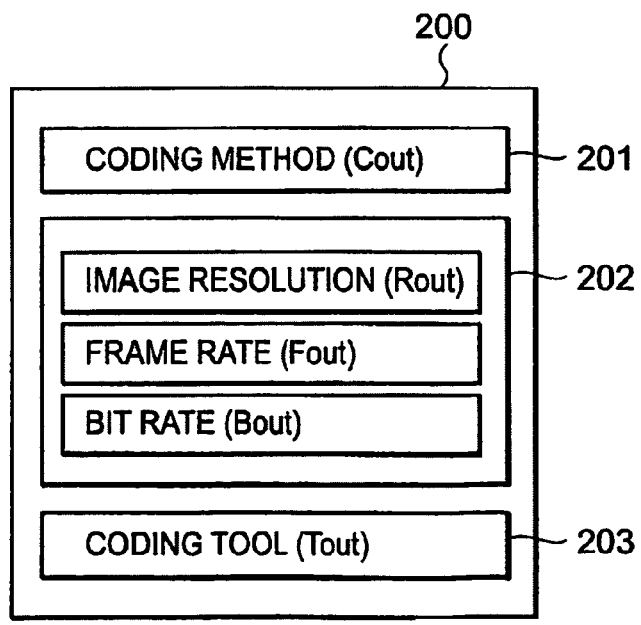
FIG. 3 is a view showing structure of connection setting information for use in the PTT server illustrated in FIG. 2.

Referring now to FIG. 3, the connection setting information 200 will be described in more detailed. The connection setting information 200 is information where a coding method (Cout) 201, coding parameters 202, and a coding tool (Tout) 203 of the image coded data into which the PTT server 10 can encode are combined. Herein, the coding method (Cout) 201 is information designating a coding format of the image coded data. The coding method (Cout) 210 is, for example, information designating MPEG-4, ITU-T (International Telecommunication Union Telecommunication Standardization Sector) recommendation H.263, or ITU-T recommendation H.264. The coding parameters 202 are information indicative of coding ability of the n-th PTT terminal 20-n. The coding parameters 202 are, for example, information indicative of an image resolution (Rout), a frame rate (Fout), and a bit rate (Bout) of the image coded data. The coding tool (Tout) 203 is information indicative of a coding tool and a time resolution where the image coded data uses. The coding tool (Tout) 203 is information designating a re-synchronous maker, data portioning, reversible variable-length code, a time resolution, and so on.

Now, the description will be made as regards a setting example of the connection setting information 200 where the coding method (Cout) 201 comprises the MPEG-4. When the coding method 201 is the MPEG-4, patterns of the coding parameters 202 and the coding tool 203 are prepared every profile and every level. It will be assumed that the image coded data is a simple profile. In this event, the following coding parameters 202 which are typical or less than the top ability of its level are prepared. For levels 0 to 1, the coding parameters where the image resolution (Rout) is GCIF (Quarter Common Intermediate Format), the bit rate (Bout) is 40 kbps, and the frame rate (Fout) is 6 fps are prepared. For level 2, the coding parameters where the image resolution (Rout) is QVGA (Quarter Video Graphics Array), the bit rate (Bout) is 128 kbps, and the frame rate (Fout) is 10 fps are prepared. For level 3, the coding parameters where the image resolution (Rout) is CIF (Common Intermediate Format), the bit rate (Bout) is 256 kbps, and the frame rate (Fout) is 15 fps are prepared. It will be assumed that specifications of the n-th PTT terminal 20-n to be connected are restricted to several kinds. In this event, patterns matched with various specifications may be prepared.

In the first through the N-th PTT terminals 20-1 to 20-N, the PTT terminals having the same specification are compliant with the connection setting information 200 in common. If the PTT terminals are different from the frame rate (Fout) and the image resolution (Rout) but have the same level, they are compliant with the connection setting information 200 in common. Accordingly, the controlling unit 110 can comply the first through the N-th PTT terminals 20-1 to 20-N with the M pieces of the connection setting information 200 that are less in number than the number N of the PTT terminals belonging to the PTT group. That is, the PTT server 10 according to this invention does not require to convert the image coded data for all of PTT terminals 20-1 to 20-N for the transmission destination and may carry out conversion processing M times. Therefore, according to this invention, it is possible to reduce an amount of processing required to conversion in the PTT server 10 in the PTT communication system 100 where the PPT terminals having different specifications exist in the PTT group.

Figure 4:
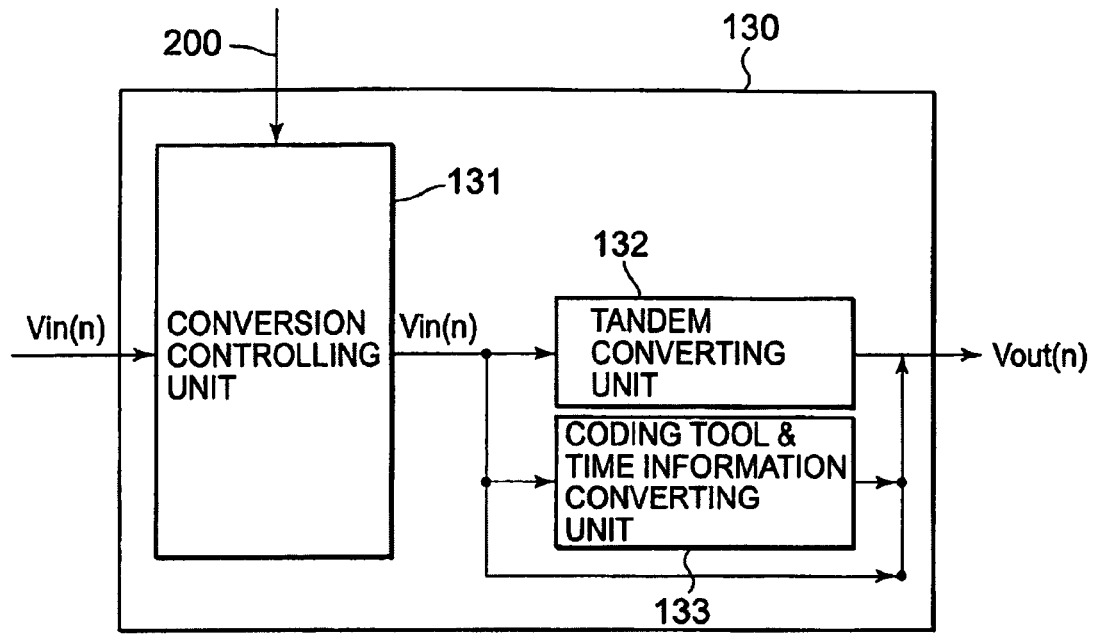
FIG. 4 is a block diagram showing structure of an image converting unit according to a first exemplary embodiment of this invention.

FIG. 4 shows a detailed construction of the image converting unit 130 according to the first exemplary embodiment of this invention. The image converting unit 130 in the first exemplary embodiment comprises a conversion controlling unit 131, a tandem converting unit 132, and a coding tool and time information converting unit 133.

The conversion controlling unit 131 determines a conversion method of the input signal Vin(n) and supplies the input signal Vin(n) with the converting unit (the tandem converting unit 132 and the coding tool and time information converting unit 133) corresponding to the determined conversion method. More specifically, the conversion controlling unit 131 compares a coding method, coding parameters, a coding tool, and so on of the input signal Vin(n) with the connection setting information 200 corresponding to the PTT terminal (the i-th PTT terminal) 20-$i$ for the transmission destination and determines, on the basis of this result, the conversion method of the input signal Vin(n). In this event, the conversion controlling unit 131 selects the conversion method which has the least degradation of quality caused by conversion and has the least amount of processing required to conversion. In addition, when no conversion is selected in the conversion controlling unit 131, the conversion controlling unit 131 delivers, to the transmitting unit 140, the input signal Vin(n) as the output signal Vout(n) as it is. The image converting unit 130 carries out the above-mentioned processing every the PTT terminal (the i-th PTT terminal) 20-$i$ for the transmission destination to produce the output signal Vout(n) corresponding to the cording ability (the decoding ability) for the transmission destination.

The input signal Vin(n) is sent to the converting unit selected by the conversion controlling unit 131. The converting units in this exemplary embodiment include the tandem converting unit 132 for changing and encoding the coding method and the coding parameters of the input signal Vin(n) and the coding tool and time information converting unit 133 for performing image coding tool conversion and resolution conversion of the time information for the input signal Vin(n) in the manner as prior art. In addition, the input signal Vin(n), which is selected as non-conversion, is delivered to the transmitting unit 140 as the output signal Vout(n) as it is.

The tandem converting unit 132 performs K types of cording processing in accordance with the coding method and the coding parameters, where K is a positive integer which is not more than M, namely, $K \leq M$.

Figure 5:
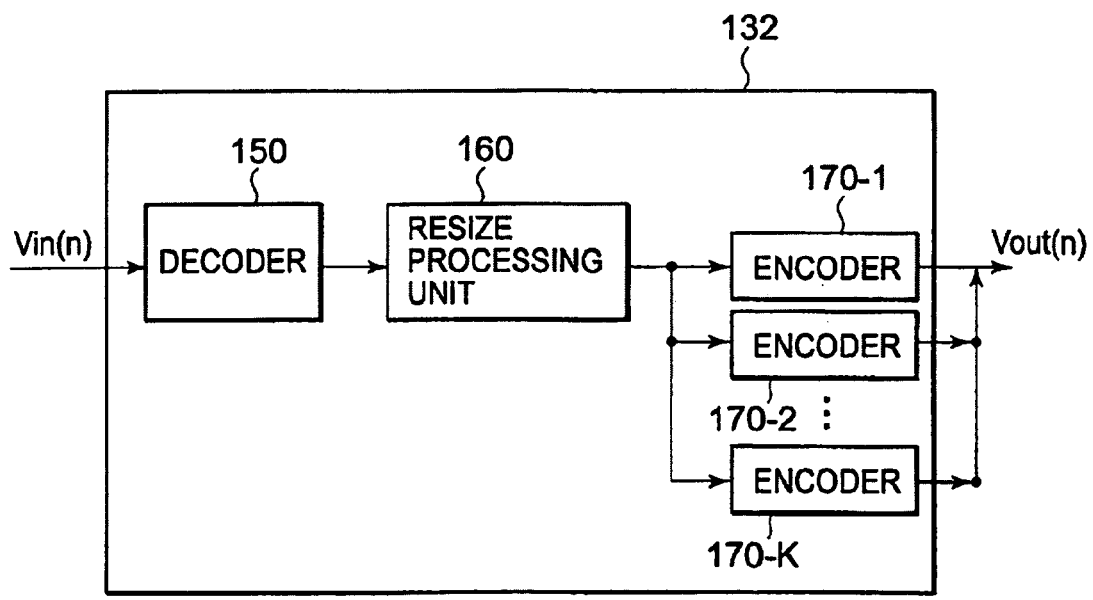
FIG. 5 is a block diagram showing structure of a tandem converting unit according to a first exemplary embodiment of this invention.

FIG. 5 shows structure of the tandem converting unit 132 according to the first exemplary embodiment of this invention. The tandem converting unit 132 according to the first exemplary embodiment comprises a decoder 150, a resize processing unit 160, and first through K-th encoders 170-1, 170-2, . . . , and 170-K. The decoder 150 decodes the input signal Vin(n) to produce a decoded signal. The resize processing unit 160 changes resolution of the decoded signal into resolution designated by the conversion controlling unit 131 to produce a changed signal. The first through the K-th encoders 170-1 to 170-K perform encoding processing for the changed signal in accordance with the coding parameters and the coding method which are preliminarily set.

It will be assumed that the conversion controlling unit 131 selects the tandem conversion. In this event, the conversion controlling unit 131 controls the tandem converting unit 132 on the basis of the comparison result of the connection setting information 200 and designates a size of the resolution in the resize processing and the encoder to be encoded. The tandem converting unit 132 performs encoding in a k-th encoder 170-$k$ designated to produce an encoded signal as the output signal Vout(n)), where k represents a variable between 1 and K, both inclusive.

Although the tandem converting unit 132 according to the first exemplary embodiment can convert the input signal Vin(n) into the K types of the output signals Vout(n), it is possible to suppress an amount of processing so as to become small because the tandem converting unit 132 comprises only one decoder 150.

(Operation)

Figure 6:
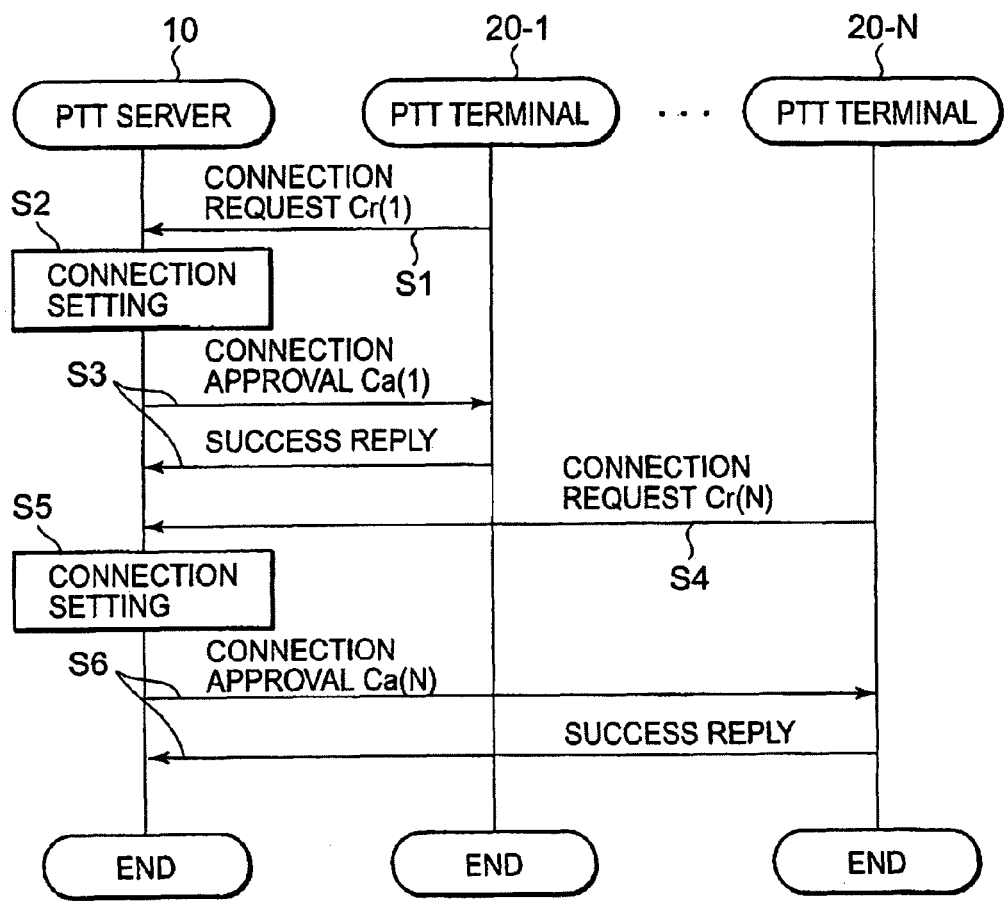
FIG. 6 is a sequence diagram showing setting operation of PTT group in the PTT communication system according to this invention.
Figure 7:
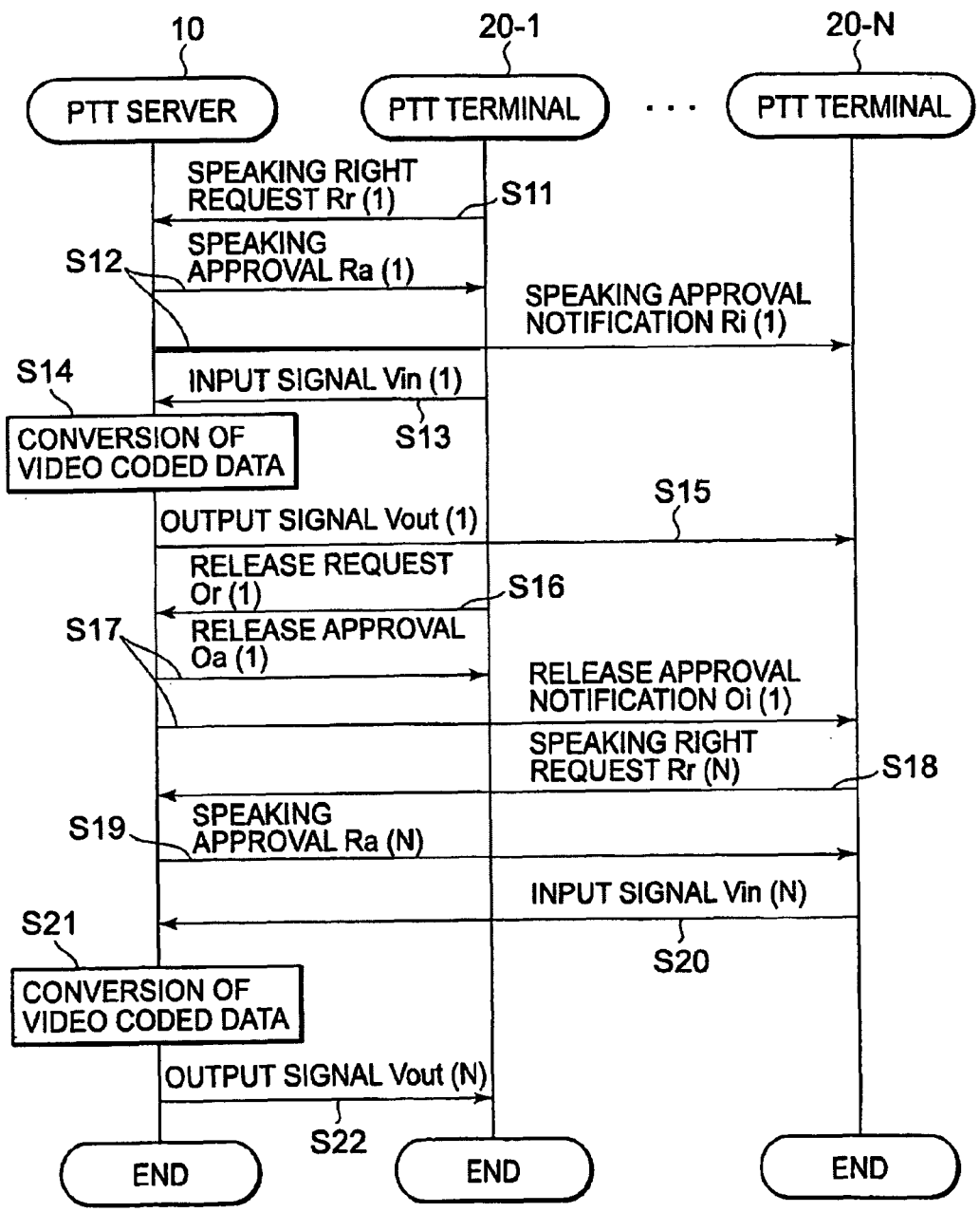
FIG. 7 is a sequence diagram showing transmitting operation of a medium coded data in the PTT communication system according to this invention.
Figure 8:
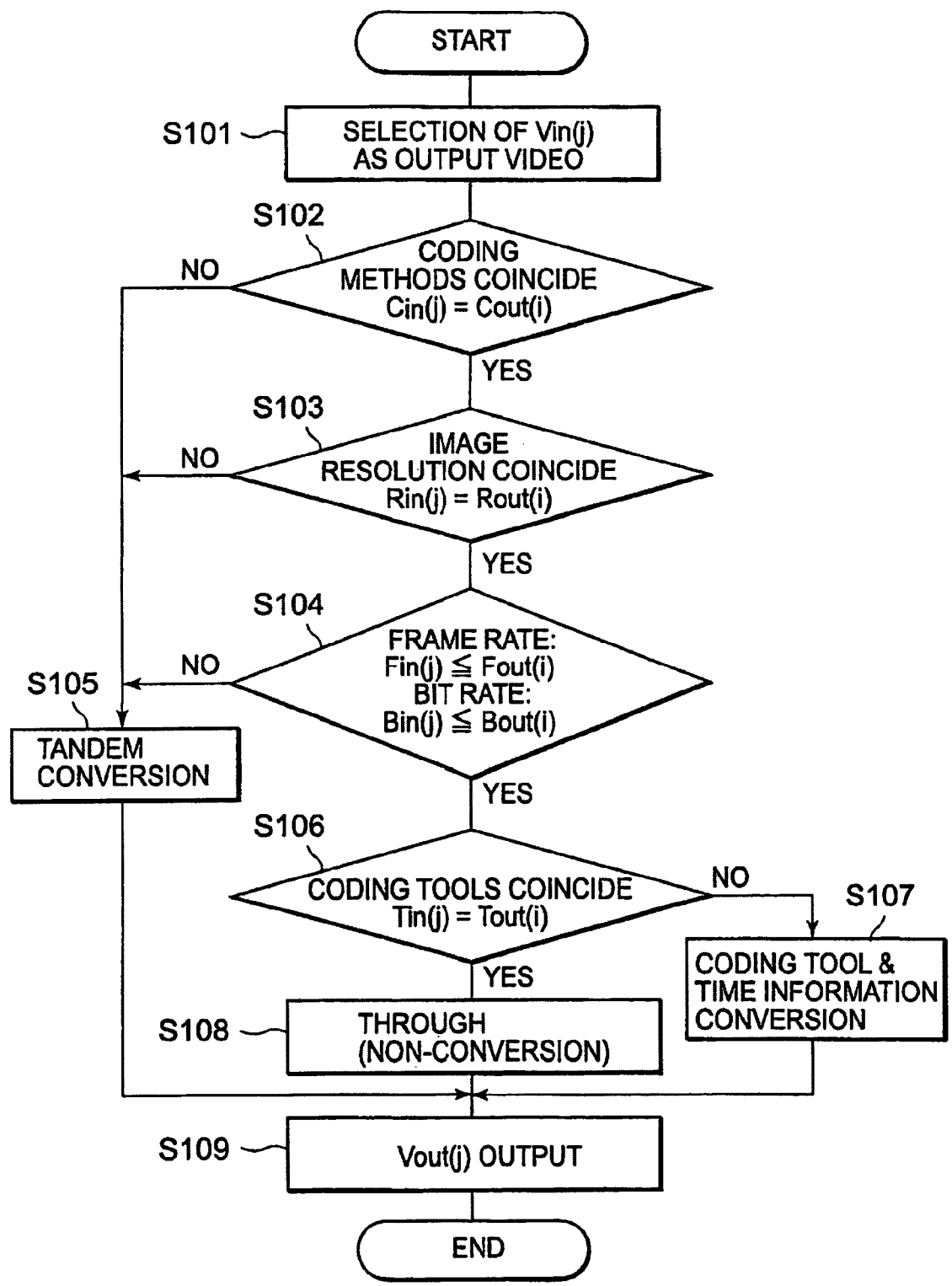
FIG. 8 is a flow chart showing selecting operation of a converting method of the medium coded data in the PTT server according to a first exemplary embodiment of this invention.

Referring to FIGS. 6 through 8, the description will be made as regards the PTT communication system 100 according to the first exemplary embodiment of this invention. FIG. 6 is a sequence diagram showing operation for setting the PTT group in the PTT communication system 100. FIG. 7 is a sequence diagram showing operation for transmitting the image coded data in the PTT communication system 100.

Referring to FIG. 6, when the PTT server 10 accommodates N PTT terminals 20-1 to 20-N as the PTT group, the PTT server 10 performs a connection setting processing (a setting processing for accommodating the PTT group) each PTT terminal. First and foremost, the first PTT terminal 20-1 issues a first connection request signal Cr(1) for participating in the PTT group to the PTT server 10 (step S1). In this event, the first PTT terminal 20-1 transmits, to the PTT server 10, the coding method, the coding parameters, the image resolution, an the coding tool of the image coded data which can encode and decode in its own terminal.

Responsive to the first connection request signal Cr(1), the PTT server 10 performs a call control processing for the first PTT terminal 20-1 (steps S2 and S3). Herein, the PTT server 10 accommodates the first PTT terminal 20-1 in the PTT group, selects, on the basis of information of coding ability (the coding method, the coding parameters, the coding tool, and so on) notified by the first PTT terminal 20-1, the most suitable connection setting information 200 for the first PTT terminal 20-1 among the connection setting information 200 prepared, and complies the fist PTT terminal 20-1 with the most suitable connection setting information 200 (step S2). In addition, on accommodating in the PTT group, the PTT terminals for the transmission destination of the coded data in the PTT group are set. Herein, the first through the N-th PTT terminals 20-1 to 20-N are set as the transmission destination.

The PTT server 10 issues a first connection approval signal Ca(1) to the first PTT terminal 20-1 (step S3). In this event, the PTT server 10 notifies the connection setting information 200 compliant with the first PTT terminal 20-1 of the first PTT terminal 20-1. In addition, responsive to the first connection approval signal Ca(1), the first PTT terminal 20-1 turns a success reply signal of the ability exchange back to the PTT server 10 (step S3). Turned the success reply signal of the ability exchange back from the first PTT terminal 20-1, the first PTT terminal 20-1 is accommodated in the PTT group. Likewise, other the second through the N-th PTT terminals 20-2 to 20-N issue second through N-th connection request signals Cr(2) to Cr(N) to the PTT server 10 (step S4) and are complied with the most suitable connection setting information 200 for the coding ability and reception environment of their own terminals (step S5). In addition, when they are accommodated in the PTT group in the step S5, the PTT server 10 issues second through N-th connection approval signal Ca(2) to Ca(N), notifies the set connection setting information 200, and is turned success reply signals back from the second through the N-th PTT terminals 20-2 to 20-N (step S6).

Alternatively, there is a method which comprises steps of issuing from the PTT server 10 to the first PTT terminal 20-1 a first connection request signal Cr(1) including all pieces of the connection setting information 200 of the PTT server 10, of selecting, in the first PTT terminal 20-1, the most suitable connection setting information 200 for its own terminal, of replying a first connection approval signal Ca(1), and of turning a success reply signal from the PTT server 10 back to the first PTT terminal 20-1. Similar operations are performed in the second through the N-th PTT terminals 20-2 to 20-N.

In the manner which is described above, the first through the N-th PTT terminals 20-1 to 20-N are accommodated in the PTT group and are assigned with the connection setting information 200 in accordance with the respective coding abilities. The PTT server 10 keeps the K types of the connection setting information 200 that is less in number than the number N of the PTT terminals 20-1 to 20-N accommodated in the PTT group. The first through the N-th PTT terminals 20-1 to 20-N are assigned with any of the M types of the connection setting information 200. In addition, although the connection setting information 200 set in the PTT server 10 is notified each n-th PTT terminal 20-*n* with a uni-cast fashion, it may be notified each PTT terminal by repeatedly distributing with a broadcast or a multicast fashion.

Referring to FIG. 7, the description will be made as regards operation for transmitting the image coded data in the PTT communication system 100 in detailed. First and foremost, description will proceed to operation in a case where the first PTT terminal 20-1 has a speaking right and transmits the image coded data to the N-th PTT terminal 20-N.

The first PTT terminal 20-1 first issues a first speaking right request signal Rr(1) to the PTT server 10 (step S11) and obtains a speaking right by a first speaking approval signal Ra(1) issued from the PTT server 10 (step S12). In addition, by a first speaking approval notification signal Ri(1) issued from the PTT server 10, other the second through the N-th PTT terminals 20-2 to 20-N know that the first PTT terminal 20-1 obtains the speaking right. The first PTT terminal 20-1 having the speaking right encodes an image data with any coding method, coding parameters (e.g. an image resolution, a frame rate, a bit rate, or the like), and a coding tool and transmits it as a first image coded data (a first input signal) Vin(1) to the PTT server 10 (step S13).

The PTT server 10 converts, on the basis of the connection setting information 200 which is set on call control, the first image coded data (the first input signal) Vin(1) received from the first PTT terminal 20-1 into an image coded data (an output signal) Vout(1) corresponding to the N-th PTT terminal 20-N for the transmission destination (step S14). In addition, in accordance with a payload option notified from the N-th PTT terminal 20-N on the call control, the PTT server 10 packets the first image coded data (the first output signal) Vout(1) after coding conversion with the RTP/UDP (User Datagram Protocol)/IP (Internet Protocol) to transmit it to the N-th PTT terminal 20-N (step S15).

On cancelling the speaking right, the first PTT terminal 20-1 issues a first release request signal Or(1) to the PTT server 10 (step S16). The PTT server 10 carries out a release processing in response to the first release request signal Or(1), issues a first release approval signal Ra(1) to the first PTT terminal 20-1, and cancels the speaking right for the first PTT terminal 20-1 (step S17). In addition, by a first release approval notification signal Oi(1), the N-th PTT terminal 20-N knows that the speaking right is released or cancelled.

Subsequently, when other the second through the N-th PTT terminals 20-2 to 20-N belonging to the PTT group have the speaking right to transmit the image coded data, obtaining of the speaking right, transmitting of the image coded data, converting of the image coded data, and relaying of it are carried out in the similar manner which is described above.

For instance, it will be assumed that the N-th PTT terminal 20-N has the speaking right and transmits the image coded data to the first PTT terminal 29-1. In this event, the N-th PTT terminal 20-N first issues an N-th speaking right request signal Rr(N) to the PTT server 10 (step S18) and obtains the speaking right by an N-th speaking approval signal Ra(N) issued from the PTT server 10 (step S19). The N-th PTT terminal 20-N having the speaking right encodes an image data using any coding method, coding ability, and a coding tool and transmits an encoded signal as an N-th image coded data (an N-th input signal) Vin(N) to the PTT server 10 (step S20). The PTT server 10 converts the N-th image coded data (the N-th input signal) Vin(N) received from the N-th PTT terminal 20-N into an N-th image coded data (e.g. an N-th output signal) Vout(N) corresponding to the first PTT terminal 20-1 for the transmission destination (step S21). In addition, on call controlling, the PTT server 10 packets, in accordance with a payload option notified from the N-th PTT terminal 20-N, the N-th output signal Vout(N) to transmit it to the first PTT terminal 20-1 (step S22). In addition, terminals other than the N-th PTT terminal 20-N knows, by an N-th speaking approval notification signal Ri(N) (not shown in FIG. 7) from the PTT server 10, that the N-th PTT terminal 20-1 obtains the speaking right.

In the manner which is described above, the PTT server 10 can convert the image coded data from one having the speaking right into the image coded data matched with the coding ability of the transmission destination to transmit it. As a matter of course, if the PTT terminals for the transmission source and the transmission destination have equivalent coding ability, the PTT server 10 transmits the image coded data without converting it.

Although this exemplary embodiment shows transmission of the coded data to a single PTT terminal, all of PTT terminals (except for the transmission source) participating in the PTT group are normally set as the transmission destinations. In this event, in the manner which is described above, at the step S14, on the basis of the connection setting information 200 corresponding to the second through the (N−1)-th PTT terminals 20-2 to 20-(N−1) participating in the PTT group, respectively, the first input signal Vin(1) is converted into the first output signal Vout(1). In addition, although illustration is not made, in the manner at the step S15, the output signals Vout(1) corresponding to the second through the (N−1)-th PTT terminals 20-2 to 20-(N−1) are transmitted to the respective PTT terminals as converted image coded data (a part thereof may be converted). The number M (including non-conversion) of the output signals Vout generated at the step S14 is less than the number N of the PTT terminals. That is, a count M of conversion processing in the PTT server 10 is a count which is less than the number (N−1) of the PTT terminals for the transmission destination. As a result, it is possible to reduce an amount of processing required to the conversion processing.

Furthermore, the image coded data for the second through the N-th PTT terminals 20-2 to 20-N may be transmitted with any method of uni-cast, multicast, or broadcast. Inasmuch as transmission is finished at one stream in the multicast and the broadcast regardless of the number of the PTT terminals to be connected, it is possible to reduce an amount of processing for transmission. In addition, the transmitting method of the image coded data may be transmission due to an original protocol in lieu of the RTP/UDP/IP.

Referring now to FIG. 8, the description will proceed to conversion processing of the image coded data in the steps S14 and S21 in detailed. Herein, the description will be exemplified in a case where, among the first through the N-th PTT terminals 20-1 to 20-N, a j-th PTT terminal 20-$j$ ($1 \leq j \leq N$) has a speaking right and transmits the image coded data to an i-th PTT terminal 20-$i$ ($1 \leq i \leq N$, $i \neq j$). That is, in the example being illustrated, the j-th PTT terminal 20-$j$ acts as the PTT terminal for the transmission source while the i-th PTT terminal 20-$i$ acts as the PTT terminal for the transmission destination.

When an j-th input signal Vin(j) is supplied from the j-th PTT terminal 20-$j$ for the transmission source to the PTT server 10, the image converting unit 130 (the conversion controlling unit 131) obtains the connection setting information 200 corresponding to the i-th PTT terminal 20-$i$ for the transmission destination and carries out comparison processing between them and the coding method, the coding parameters, the coding tool, and so on of the j-th input signal Vin(j) (step S101). Herein, it will be assumed that a coding method (Cin), an image resolution (Rin), a frame rate (Fin), a bit rate (Bin), and a coding tool (Tin) of the j-th input signal Vin(j) are represented by a j-th coding method Cin(j), a j-th image resolution Rin(j), a j-th frame rate Fin(j), a j-th bit rate Bin(j), and a j-th coding tool Tin(j), respectively, while the coding method (Cout), the image resolution (Rout), the frame rate (Fout), the bit rate (Bout), and the coding tool (Tout) corresponding to the i-th PTT terminal 20-$i$ for the transmission destination are represented by an i-th coding method Cout(i), an i-th image resolution Rout(i), an i-th frame rate Fout(i), an i-th bit rate Bout(i), and an i-th coding tool Tout(i), respectively.

The conversion controlling unit 131 compares the coding method 201 and the coding parameters 202 of the connection setting information 200 corresponding to the i-th PTT terminal 20-$i$ for the transmission destination with the coding method and the coding parameters of the j-th input signal Vin(j) and determines whether or not the j-th input signal Vin(j) should be tandem transformed on the basis of its comparison result (steps S102 to S104). Herein, the conversion controlling unit 131 compares the j-th coding method Cin(j) with the i-th coding method Cout(i), the j-th image resolution Rin(j) with the i-th image resolution Rout(i), the j-th frame rate Fin(j) with the j-th frame rate Fin(i), ant the bit rate Bin(j) with the i-th bit rate Bout(i). Under the circumstances, when the comparison result is any one where the coding methods (C) do not coincide (NO at a step S102), the j-th image resolution Rin(j) and the i-th image resolution Rout(i) do not coincide (NO at a step S103), the i-th frame rate Fout(i) is less than the j-th frame rate Fin(j) (NO at a step S104), or the j-th bit rate Bout(i) is less than the j-th frame rate Bin(j) (NO at the step S104), the conversion controlling unit 131 selects the tandem conversion.

When the conversion controlling unit 131 selects the tandem conversion in the steps S102 to S104, it delivers the j-th input signal Vin(j) to the tandem converting unit 132. The tandem converting unit 132 converts, on the basis of the connection setting information 200 corresponding to the i-th PTT terminal 20-$i$ for the transmission destination, the coding method or the coding parameters of the j-th input signal Vin(j) into a converted signal (step S105) and delivers the converted signal as a j-th output signal Vout(j) to the transmitting unit 140 (step S109). Specifically, in the tandem converting unit 132, the decoder 150 decodes the j-th input signal Vin(j) into a decoded i-th input signal which is supplied to the resize processing unit 160. When the j-th image resolution Rin(j) of the j-th input signal Vin(j) is larger than the i-th image resolution Rout(i) for the transmission destination, the resize processing unit 160 converts the j-th image resolution Rin(j) of the decoded j-th input signal Vin(j) into the i-th image resolution Rout(i). When the j-th image resolution Rin(j) of the j-th input signal Vin(j) is not larger than the i-th image resolution Rout(i) for the transmission destination, the resize processing is omitted. Subsequently, encoding processing is carried out in the k-th encoder 170-$k$ on the basis of the connection setting information 200 corresponding to the i-th PTT terminal 20-$i$ for the transmission destination. That it, the i-th input signal Vin(j) after resizing is encoded with the i-th coding method Cout(i), the i-th frame rate Fout(i), and the i-th bit rate Bout(i) for the transmission destination and an encoded signal is delivered to the transmitting unit 140 as the j-th output signal Vout(j).

On the other hand, in comparison processing (the steps S102 to S104) between the coding method and the coding parameters of the transmission source and them of the transmission destination, when both of coding methods (C) and both of image resolutions (R) coincide (YES at the step S102 and YES at the step S103) and when the i-th frame rate Fout(i) is not less than the j-th frame rate Fin(j) and the i-th bit rate Bout(i) is not less than the j-th bit rate Bin(j) (YES at the step S104), the conversion controlling unit 131 carries out comparison processing between the coding tools (T) corresponding to the transmission source and of the transmission destination (step S106). Herein, it is determined whether or not a coding tool and time information conversion processing for the j-th input signal Vin(j) is carried out.

When the j-th coding tool Tin(j) for the transmission source and the i-th coding tool Tout(i) for the transmission destination do not coincide at the step S106, the conversion controlling unit 131 selects the coding tool and time information conversion and delivers the j-th input signal Vin(j) to the coding tool and time information converting unit 133. The coding tool and time information converting unit 133 converts the j-th input signal Vin(j) into the j-th output signal Vout(j) using the i-th coding tool Tout(i) by processing similar to prior art.

When both coding tools (T) coincide with each other at the step S106, the conversion controlling unit 131 selects non-conversion (step S108) and produces the j-th input signal Vin(j) as the j-th output signal Vout(j) as it is.

In the manner which is described above, the PTT server 10 can convert the j-th image coded data (the j-th input signal) Vin(j) transmitted from the j-th PTT terminal 20-$j$ for the transmission source into data (the j-th output signal) Vout(j) having a coding format matched with coding ability (decoding ability) of the i-th PTT terminal 20-$i$ for the transmission destination. In addition, when the i-th PTT terminal 20-$i$ for the transmission destination can decode the j-th image coded data transmitted from the j-th PTT terminal 20-$j$ for the transmission source, the PTT server 10 transmits the j-th image coded data (the i-th input signal) Vin(j) to the i-th PTT terminal 20-$i$ without conversion.

The transmitting unit 140 transmits, on the basis of a port number and an IP address designated by the controlling unit 110, the j-th output signal Vout(j) produced by the image converting unit 130 to the i-th PTT terminal 20-$i$ for the transmission destination as the image coded data. When there are a plurality of PTT terminals 20-$n$ for transmission destination, the image converting unit 130 carries out the above-mentioned conversion operation (the steps S101 to S109) every PTT terminal for the transmission destination and delivers the respective j-th output signals Vout(j) to the transmitting unit 140. Under the circumstances, the number M (including non-conversion) of the j-th output signals Vout(j) sent to the transmitting unit 140 is less than the number (N−1)

of the PTT terminals for the transmission destination. The encoding abilities in the all PTT terminals 20-1 to 20-N belonging to the PTT group are normally not different from one another and in many case there are the PTT terminals having common coding method and common encoding ability. In addition, it is possible to convert the coded data with common coding processing by setting, in the PTT terminal having a high coding ability, the coding parameters 202 matched with the PTT terminal having a low coding ability. As a result, the number of conversion processing for the coded data is determined in accordance with the number M of pieces of the connection setting information 200 set in the PTT server 10 independent of the number N of the PTT terminals belonging to the PTT group. Therefore, the PTT server 10 does not require to carry out conversion processing in accordance with the coding abilities corresponding to the all of PTT terminals of transmission destination and can realize replay processing of the image coded data with M times of conversion processing.

Second Exemplary Embodiment

Figure 9:
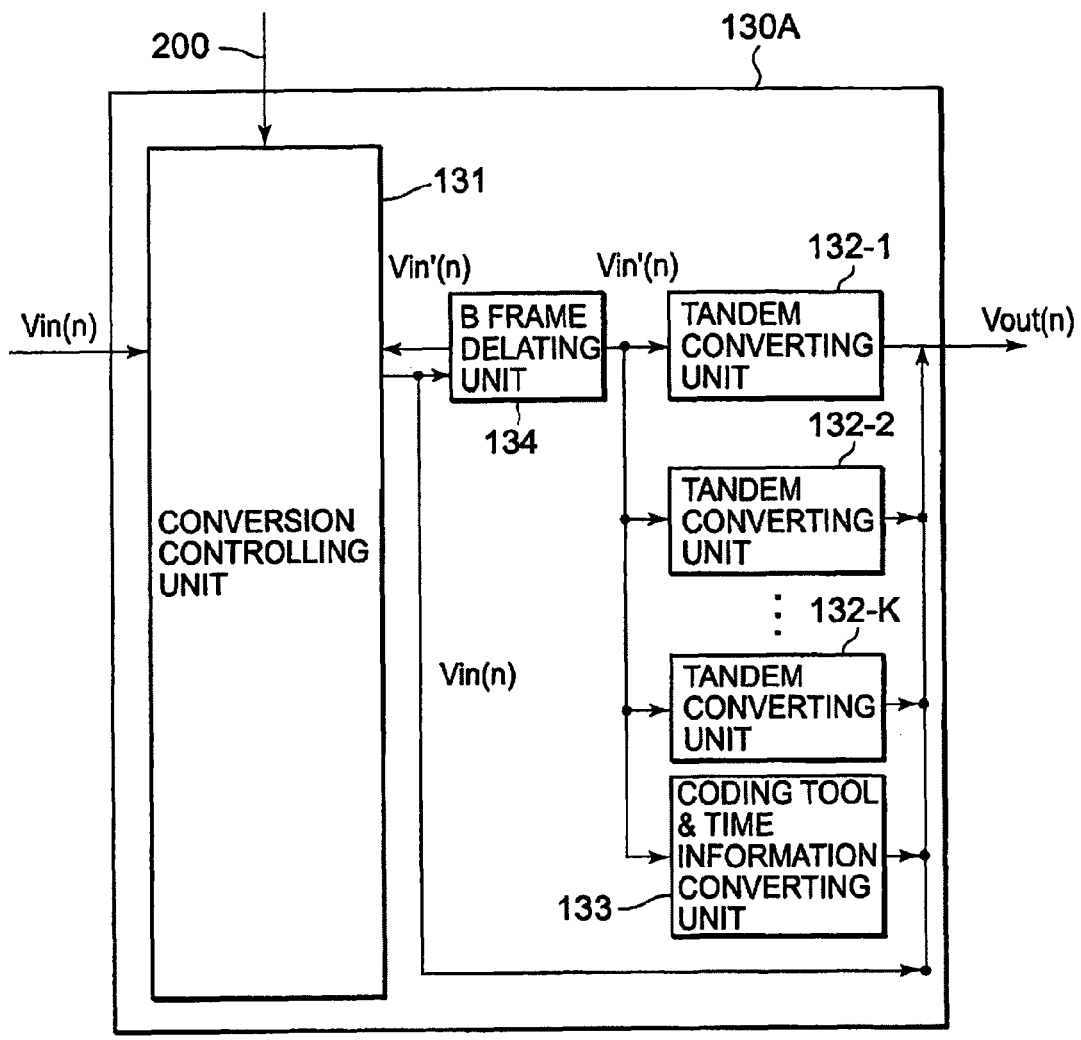
FIG. 9 is a block diagram showing structure of an image converting unit according to a second exemplary embodiment of this invention.
Figure 10:
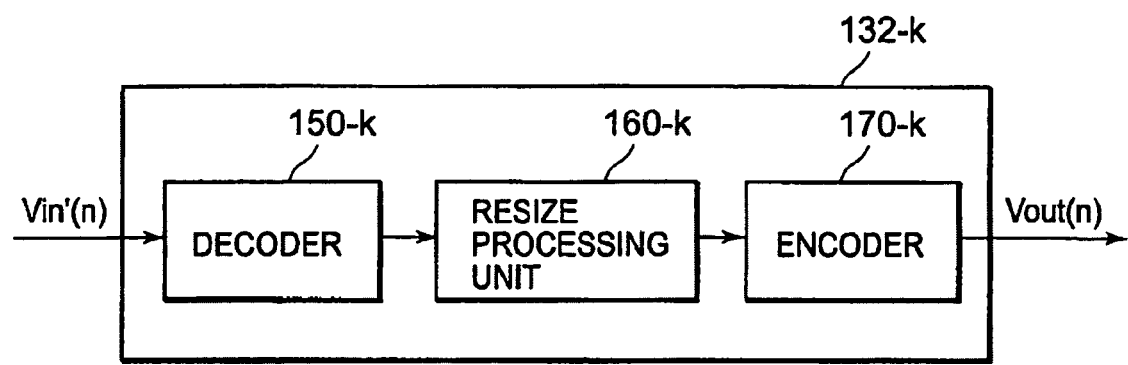
FIG. 10 is a block diagram showing structure of a tandem converting unit according to a second exemplary embodiment of this invention.
Figure 11:
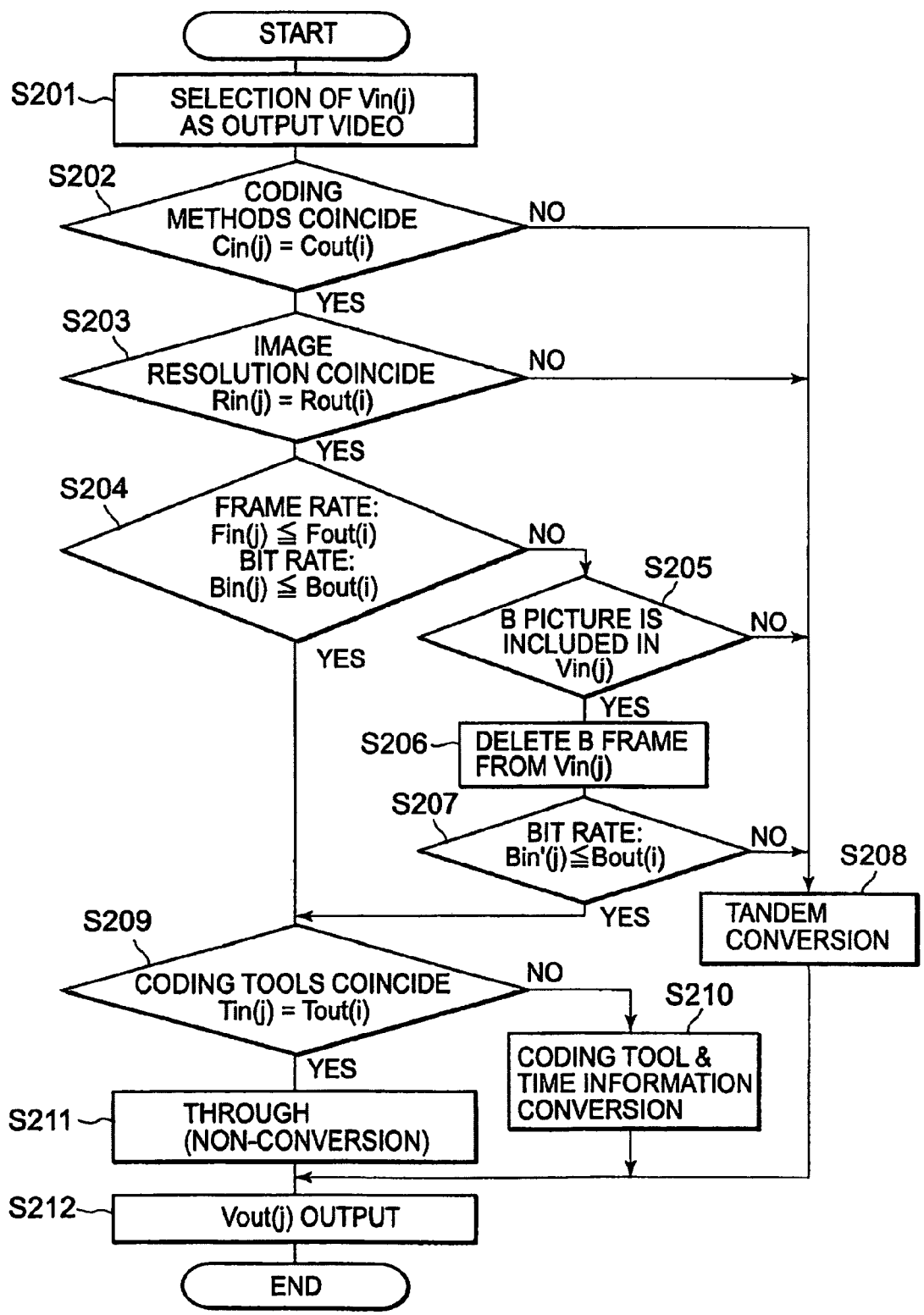
FIG. 11 is a flow chart showing selecting operation of a converting method of the medium coded data in the PTT server according to a second exemplary embodiment of this invention.

Referring to FIGS. 9 through 11, the description will proceeds to a PTT communication system 100 according to a second exemplary embodiment of the present invention. In the PTT communication system 100 according to the second exemplary embodiment, the PTT server 10 comprises an image converting unit 130A comprising a B frame deleting unit 134 and first through K-th tandem converting units 132-1 to 132-K in lieu of the image converting unit 130 of the PTT server 10 in the PTT communication system according to the first exemplary embodiment. When the input signal Vin(n) includes a bidirectionally predictive-coded picture (B picture) frame, the B frame deleting unit 134 deletes the B picture frame from the input signal Vin(n), where K represents the number equal to the above-mentioned number K.

Referring to FIG. 9, in similar manner of the conversion controlling unit 131 in the first exemplary embodiment, the conversion controlling unit 131 compares the coding method, the coding parameters, and the coding tool of the input signal Vin(n) with the connection setting information 200 corresponding to the PTT terminal for the transmission destination and determines a conversion method of the input signal Vin (n) on the basis of its comparison result. When the B picture frame is included in the input signal Vin(n), comparison processing of the bit rates B in the second exemplary embodiment is carried out for the bit rates B after the B picture frame is deleted. When the tandem conversion is selected as the conversion method, the conversion controlling unit 131 determines a k-th tandem converting unit 132-$k$ carrying out the conversion processing in accordance with its conversion contents (the PTT terminal for the transmission destination). Other structures in the image converting unit 130A of the second exemplary embodiment are similar to those of the image converting unit 130 of the first exemplary embodiment.

FIG. 10 is a block diagram showing structure of the k-th tandem converting unit 132-$k$ in the second exemplary embodiment. The k-th tandem converting unit 132-$k$ comprises a k-th decoder 150-$k$, a k-th resize processing unit 160-$k$, and a k-th encoder 170-$k$. Designated by the conversion controlling unit 131, the k-th tandem converting unit 132-$k$ carries out decoding processing, resize processing, and encoding processing of a deleted input signal Vin'(n) obtained by deleting the B picture frame from the input signal Vin(n) in the B frame deleting unit 134.

Referring to FIG. 11, the description will be made as regards operation of conversion processing of the image coded data in the second exemplary embodiment. In the similar manner of the first exemplary embodiment, when the j-th input signal Vin(j) is supplied to the PTT server 10 from the j-th PTT terminal 20-$j$ for the transmission source, the image converting unit 130A (the conversion controlling unit 131) obtains the connection setting information 200 corresponding to the i-th PTT terminal 20-$i$ for the transmission destination and carries out comparison processing between them and the coding method, the coding parameters, the coding tool, and soon of the input signal Vin(j) (step S210). The conversion controlling unit 131 compares the coding method 201 and the coding parameters 202 of the transmission destination with the coding method and the coding parameters of the input signal Vin(j) and determines whether or not the input signal Vin(j) is tandem converted on the basis of its comparison result (steps S202 to S204). Inasmuch as operations of comparison and selection of conversion method in the steps S202 and S203 are similar to those of the steps S102 and S103 in FIG. 8, description thereof will be omitted.

At the step S204, in similar manner at the step S104 illustrated in FIG. 8, the frame rates (F) and the bit rates (B) are compared. When the i-th frame rate Fout(i) is not less than the j-th frame rate Fin(j) and when the i-th bit rate Bout(i) is not less than the j-th bit rate Bin(j) (YES at the step S204), in similar manner at the step S106 in the first exemplary embodiment, comparison is carried out whether or not the j-th coding tool Tin(j) of the j-th input signal Vin(i) and the i-th coding tool Tout(i) corresponding to the i-th PTT terminal 20-$i$ for the transmission destination coincide with each other to carry out decision whether or not the coding tool and time information conversion is necessary (step S209).

When the coding tools (T) do not coincide at the step S209, in similar manner of the first exemplary embodiment, the coding tool and time information conversion is carried out to convert the j-th input signal Vin(j) into the j-th output signal Vout(j) using the i-th coding tool Tout(i) (steps S210 and S212). When the coding tools (T) coincide with each other at the step S209, the conversion controlling unit 131 selects non-conversion and produces the j-th input signal Vin(j) as the j-th output signal Vout(j) as it is (step S211).

At the step S204, when the i-th frame rate Fout(i) is less than the j-th frame rate Fin(j) or when the i-th bit rate Bout(i) is less than the j-th bit rate Bin(j), the conversion controlling unit 131 confirms whether or not the B picture frame is included in the j-th input signal Vin(j) (step S205). When the B picture frame is included in the j-th input signal Vin(j), the conversion controlling unit 131 delivers the j-th input signal Vin(j) to the B frame deleting unit 134. The B picture deleting unit 134 deletes the B picture frame from the j-th input signal Vin(j) to produce a deleted j-th input signal Vin'(j) so that an deleted j-th frame rate Fin'(j) of the deleted j-th input signal Vin'(j) becomes the i-th frame rate Fout(i) corresponding to the i-th PTT terminal 20-$i$ for the transmission destination (step S206). The conversion controlling unit 131 compares a deleted j-th bit rate Bin'(j) of the deleted j-th input signal Vin'(j) with the i-th bit rate Bout(i) corresponding to the i-th PTT terminal 20-$i$ for the transmission destination (step S207).

At the step S207, when the i-th bit rate Bout(i) is less than the deleted j-th bit rate Bin'(j), the conversion controlling unit 131 selects the k-th tandem converting unit 132-$k$ for performing the code conversion processing in accordance with the connection setting information 200 corresponding to the i-th PTT terminal 20-$i$ for the transmission destination and delivers the deleted j-th input signal Vin'(j) to the k-th tandem converting unit 132-$k$ (NO at the step S207). Herein, the conversion controlling unit 131 controls the B frame deleting unit 134 to make the B frame deleting unit 134 supply the selected k-th tandem converting unit 132-*k* with the deleted j-th input signal Vin'(j). Supplied with the deleted j-th input signal Vin'(j), the k-th tandem converting unit 132-*k* performs the decoding processing, the resize processing, and the encoding processing in the similar manner of the first exemplary embodiment (step S208). The deleted input signal Vin'(j) is re-encoded in the k-th tandem converting unit 132-*k* into a re-encoded signal which is delivered to the transmitting unit 140 as the j-th output signal Vout(j) (the step S212).

At the step S207, when the i-th bit rate Bout(i) is not less than the deleted j-th bit rate Bin'(j), the step S207 is followed to the steps S209 to S212.

There may be cases where the B picture frame which is not less than the frame rate (Fout) corresponding to the i-th PTT terminal 20-*i* for the transmission destination is included in the image coded data transmitted from the j-th PTT terminal 20-*j* for the transmission source. In the second exemplary embodiment, it is possible to reduce an amount of processing in the k-th decoder 150-*k* by deleting the B picture frame before tandem converting such image coded data. When the tandem conversion is selected at the step S208, the conversion controlling unit 131 may confirm whether or not the B picture frame still remains in the deleted j-th input signal Vin'(j), may delete the remaining B picture frame if it remains, and may carry out decision at the step S207 again.

In the manner which is described above, according to the PTT communication system 100 according to this invention, M types of connection setting information 200 less in number than the number N of the PTT terminals 20-1 to 20-N belonging to the PTT group are prepared, on the basis of comparison result between the coding method, the coding parameters, and the coding tool of the transmitted image coding data and the connection setting information 200 corresponding to the PTT terminal 20-*i* for the transmission destination, the image coding data is re-encoded or coding tool converted. Therefore, according to this invention, on exchanging bidirectionally data of speech or image between a plurality of terminals, it is possible to convert outputs of the respective terminals into the coding method, the coding parameters, the coding tool, the time information, and payload suited to ability of the terminal at the other end.

The PTT server 10 according to this invention can convert the input image coded data into the image coded data in accordance with the coding method and the coding parameters of the transmission destination by conversion processing of M times which is less to the number N of the terminals belonging to the PTT group. In addition, the PTT server 10 carries out the conversion processing by selecting the conversion method which has the least quality degradation due to the conversion and the least amount of processing required to the conversion. As a result, according to this invention, it is possible to relay medium coded data by providing effective conversion processing where processing load is decreased.

In the first and the second exemplary embodiments of the present invention, the connection setting information 200 is information specifying coding setting information of the output coded data. The number M of pieces of the connection setting information 200 is less than the number N of the PTT terminals. Therefore, the PTT server 10 does not carry out conversion of the coded data along ability of all of the PTT terminals 20-1 to 20-N but carries out conversion of restricted patterns. It is possible for the PTT server 10 to decrease a processing amount of the conversion.

The connection setting information 200 preferably may include, as the coding setting information, the coding method 201 and/or the coding parameters 202 of the output coded data. In this event, the medium converting unit 130 preferably may comprise the conversion controlling unit 131 and the tandem converting unit 132 or 132-*k*, where k represents a variable between 1 and K, both inclusive. The conversion controlling unit 131 compares the coding method and the coding parameters of the input medium coded data Vin(n) with the connection setting information 200 compliant with the PTT terminal 20-*i* for the transmission destination to deliver, in accordance with its comparison result, the input medium coded data Vin(n) to the tandem converting unit 132 or 132-*k* or to the transmitting unit 140. The tandem converting unit 132 or 132-*k* may comprise a decoder for decoding the input medium coded data Vin(n) into a decoded medium coded data and an encoder 170 or 170-*k* for encoding the decoded medium coded data with the coding method 210 and the coding parameters 202 included in the connection setting information 200 compliant with the PTT terminal 20-*i* for the transmission destination into an encoded data to deliver, to the transmitting unit 140, the encoded data as the output coded data Vout(n) corresponding to the PTT terminal 20-*i* for the transmission destination. When the input medium coded data Vin(n) is supplied to the tandem converting unit 132 or 1320*k*, it is possible to re-encode the input medium coded data Vin(n) with the coding method which is enable to encode (decode) in the PTT terminal 20-*i* for the transmission destination. In addition, when the input medium coded data Vin(n) is supplied to the transmitting unit 140, the output coded data Vout(n) is transmitted to the PTT terminal 20-*i* with non-conversion.

When the coding method of the input medium coded data Vin(n) is different from the coding method 201 included in the connection setting information 200 compliant with the PTT terminal 20-*i* for the transmission destination, the conversion controlling unit 131 preferably may deliver the input medium coded data Vin(n) to the tandem converting unit 132 or 132-*k* corresponding to the connection setting information 200.

In addition, the connection setting information 200 preferably may include, as the coding parameters 202, an image resolution Rout. In this event, when the coding method of the input medium coded data Vin(n) coincides with the coding method 201 included in the connection setting information 200 compliant with the PTT terminal 20-*i* for the transmission destination and when image resolution of the input medium coded data Vin(n) is different from the image resolution Rout included in the connection setting information 200 compliant with the PTT terminal 20-*i* for the transmission destination, the conversion controlling unit 131 delivers the input medium coded data Vin(n) to the tandem converting unit 132 or 132-*k* corresponding to the connection setting information. Furthermore, the tandem converting unit 132 or 132-*k* preferably may comprise a resize processing unit 160 or 160-*k* for changing the image resolution of the input medium coded data Vin(n) into an image resolution corresponding to the PTT terminal 20-*i* for the transmission destination.

In addition, the connection setting information 200 preferably may include, as the coding parameters 202, a frame rate Fout and a bit rate Bout. In this event, when the coding method and the image resolution of the input medium coded data Vin(n) coincide with the coding method 201 and the image resolution Rout included in the connection setting information 200 compliant with the PTT terminal 20-*i* for the transmission destination and when a frame rate and a bit rate of the input medium coded data Vin(n) are more than the frame rate Fout and the bit rate Bout included in the connection setting information 200 compliant with the PTT terminal 20-$i$ for the transmission destination, the conversion controlling unit 131 delivers the input medium coded data Vin(n) to the tandem converting unit 132 or 132-$k$ corresponding to the connection setting information 200.

The medium converting unit 130A preferably may further comprise the B frame deleting unit 134 for deleting a bidirectionally predictive-coded picture frame from the input medium coded data Vin(n) to produce a deleted medium coded data Vin'(n). In this event, when a bit rate of the deleted medium coded data Vin'(n) is larger than the bit rate Bout included in the connection setting information 200 compliant with the PTT terminal 20-$i$ for the transmission destination, the conversion controlling unit 131 delivers the deleted medium coded data Vin'(n) to the tandem converting unit 132-$k$.

Furthermore, the connection setting information 200 preferably may include the coding tool 203 where the corresponding PTT terminal 20-$n$ uses for coding. In this event, the medium converting unit 130 or 130A preferably may further comprise the coding tool converting unit 133 for converting the input medium coded data Vin(n) with the coding tool 203 included in the connection setting information 200 compliant with the PTT terminal 20-$i$ for the transmission destination into a converted data to deliver, to the transmitting unit 140, the converted data as the output coded data Vout(n) corresponding to the PTT terminal 20-$i$ for the transmission destination. When the coding tool of the input medium coded data Vin(n) is different from the coding tool 203 corresponding to the PTT terminal 20-$i$ for the transmission destination, the conversion controlling unit 131 delivers the input medium coded data Vin(n) to the coding tool converting unit 133. When both coincide with each other, the conversion controlling unit 131 delivers the input medium coded data Vin(n) to the transmitting unit 140 as the output coded data Vout(n) corresponding to the transmission destination.

Third Exemplary Embodiment

Referring to FIGS. 12 through 16, the description will proceed to the PTT communication system 100 according to a third exemplary embodiment of the present invention. In the PTT communication system 100 according to the third exemplary embodiment of the present invention, speech coded data is used as the medium coded data.

The PTT communication system 100 according to the third exemplary embodiment of the present invention comprises a PTT server 10A in lieu of the PTT server 10. The PTT server 10A converts a speech coded data received from the PTT terminal (the j-th PTT terminal) 20-$j$ for the transmission source into a speech coded data corresponding to the PTT terminal (the i-th PTT terminal) 20-$i$ for the transmission destination and transmits it thereto. The PTT server 10A holds a conversion method corresponding to the PTT terminal (the i-th PTT terminal) for the transmission destination as connection setting information 210 which will later be described and performs a conversion processing (a recoding processing) on the basis of the connection setting information 210 on replying the speech coded data.

Figure 12:
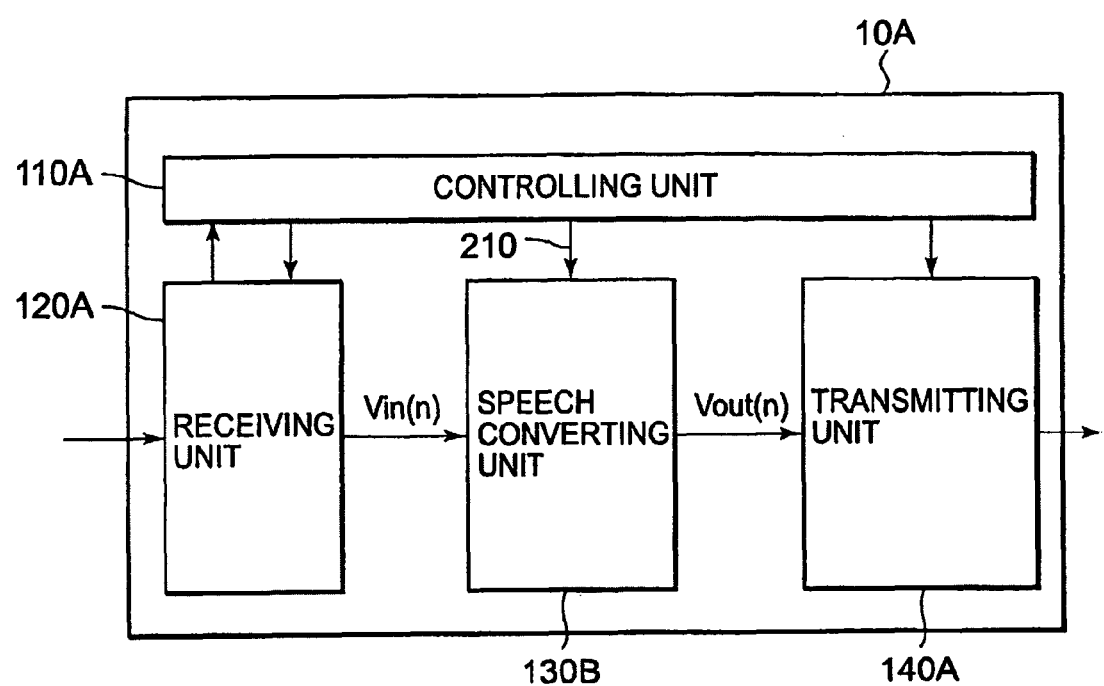
FIG. 12 is a block diagram showing structure of a PTT server according to a second exemplary embodiment of this invention.

Referring to FIG. 12, the construction of the PTT server 10A will be described in more detailed. The PTT server 10A comprises a controlling unit 11A, a receiving unit 120A, a speech converting unit 130B, and a transmitting unit 140A. The speech converting unit 130B is also called a medium converting unit. The controlling unit 110A carries out transmission/reception of various signals and data between the n-th PTT terminal 20-$n$ through the receiving unit 120A and the transmitting unit 140A and performs call control and control of the speaking right.

Specifically, the controlling unit 110A carries out participating and leaving processing of the n-th PTT terminal 20-$n$ belonging to the PTT group using the SIP/SDP and carries out the control of the speaking right between the n-th PTT terminal 20-$n$ and it using the TBCP or the RTCP. In addition, the controlling unit 110A controls, as the connection setting information 210, coding setting information of a coded data Vout(n) which the PTT server 10A enables to produce. The coded data Vout(n) is called an output coded data Vout(n). Herein, the output coded data Vout(n) will be also called an output data Vout(n) hereunder. The coding setting information comprises, for example, a coding method, coding parameters, a coding tool, and so on.

On forming the PTT group, the controlling unit 110A selects the optimal connection setting information 210 to the respective PTT terminals on the basis of the coding ability of the PTT terminal notified from the first through the N-th PTT terminals 20-1 to 20-N through the receiving unit 120A, respectively, carries out the ability exchange with the call connection processing, and complies with the PTT terminals. In addition, the controlling unit 110A controls the first through the N-th PTT terminals 20-1 to 20-N by complying with M pieces of the connection setting information 210 that are less in number to N, where M represents an integer which is less than one. That is, N>M≧1.

The receiving unit 120A comprises a plurality of receiving ports which are not shown in figures. The receiving unit 120A receives various signal or data from the n-th PTT terminal 20-$n$ which is connected to any of the receiving ports and sends them to the controlling unit 110A and the speech converting unit 130B. The receiving unit 120A receives a speech coded data from the n-th PTT terminal 20-$n$ connected to the receiving port designated by the controlling unit 110A and sends it as an input signal Vin(n) to the speech converting unit 130B. In addition, the receiving unit 120A may be a physical receiving module or a logical receiving session.

The speech converting unit 130B converts the coding method and so on of the input signal Vin(n) on the basis of the connection setting information 210 obtained from the controlling unit 110A to generate the output signal Vout(n). More specifically, the speech converting unit 130B first compares coding setting information of the input signal Vin(n) with the connection setting information 210 corresponding to the PTT terminal for the transmission destination. Herein, the coding setting information comprises, for example, a coding method, coding parameters, a coding tool, and so on. Subsequently, the speech converting unit 130B converts, with a converting method determined on the basis of its comparison result, the input signal Vin(n) into the output signal Vout(n) to send the output signal Vout(n) to the transmitting unit 140A. In addition, the controlling unit 110A acquires the coding setting information of the input signal Vin(n) on ability exchange in the call connection processing and determines the converting method using the coding setting information.

The transmitting unit 140A comprises a plurality of transmitting ports which are not shown in the figures. The transmitting ports normally share the receiving ports. The transmitting unit 140A transmits the output signal Vout(n) produced by the speech converting unit 130B to any one (the i-th PTT terminal 20-$i$ in this example) of the PTT terminals (the first through the N-th PTT terminals 20-1 to 20-N in this example) connected to the transmitting ports. In this event, the controlling unit 110A designates the transmitting unit 140A with a port number and an IP address of the PTT terminal (the i-th PTT terminal) 20-$i$ for the transmission destination. When there are a plurality of output signals Vout(n) generated, the controlling unit 110A designates the transmitting unit 140A for the output signal Vout(n) corresponding to the PTT terminal (the i-th PTT terminal) 20-$i$ for the transmission destination. The transmitting unit 140A transmits the designated output signal Vout(n) as the speech coded signal to the corresponding PTT terminal (the i-th PTT terminal) 20-$i$. In addition, the transmitting unit 140A may be a physical transmitting module or a logical transmitting session.

In addition, the controlling unit 110A and the speech converting unit 130B may be realized by a program which is executed by a computer. That is, the controlling unit 110A may comprise a control processor (not shown) and a memory device (not shown). In this event, the control processor carries out the above-mentioned control operation in accordance with a control program stored in the memory device. The speech converting unit 130B may comprise a speech converting processor (not shown) and a memory device (not shown). In this event, the speech converting processor carries out the above-mentioned speech converting operation in accordance with a speech converting program stored in the memory device. Alternatively, the controlling unit 110A and the speech converting unit 130B may comprise a processor (not shown) and a memory device (not shown). In this event, the processor carries out the above-mentioned control operation and the above-mentioned speech converting operation in accordance with a program stored in the memory device.

Figure 13:
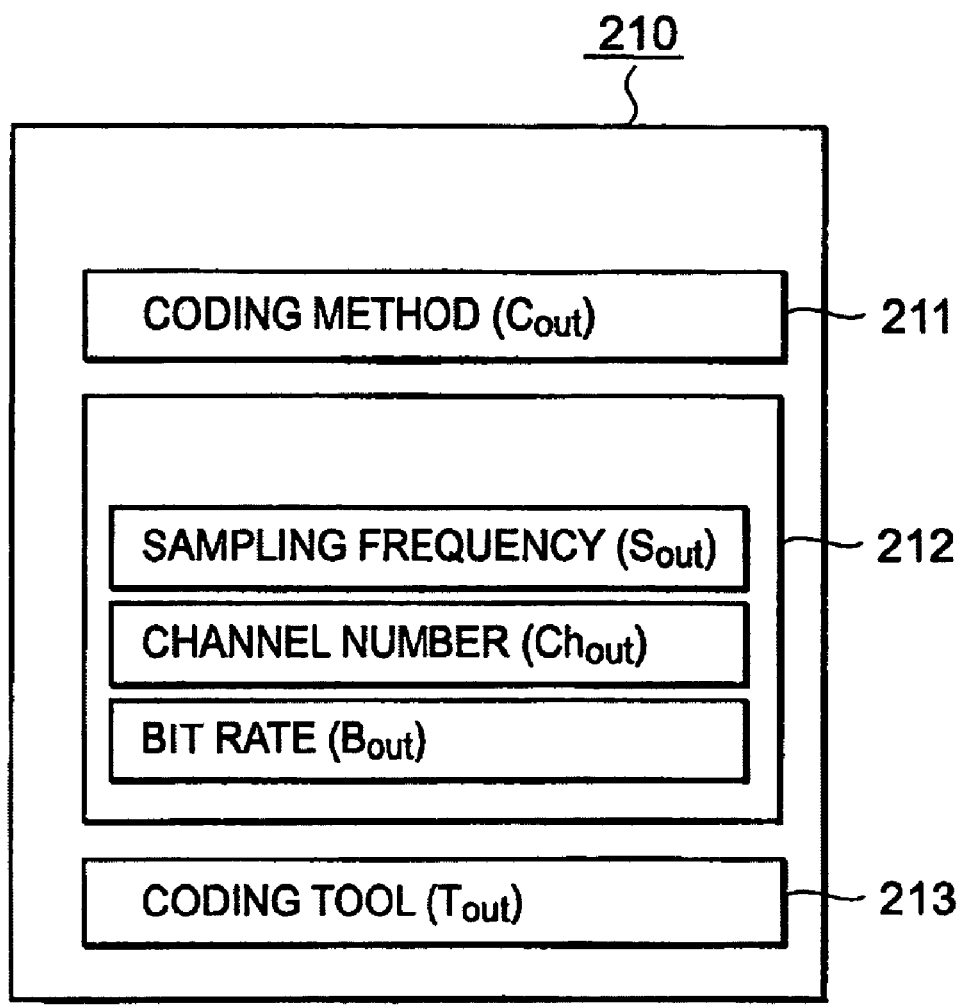
FIG. 13 is a view showing structure of connection setting information for use in the PTT server illustrated in FIG. 12.

FIG. 13 shows the connection setting information 210 for use in the PTT server 10A. The connection setting information 210 is information where a coding method (Cout) 211, coding parameters 212, and a coding tool (Tout) 203 of the speech coded data into which the PTT server 10A can encode are combined. Herein, the coding method (Cout) 211 is information designating a coding format of the speech coded data. The coding method (Cout) 211 is, for example, information designating ITU-T recommendation G.711, ITU-T recommendation G.729, ADR (Adaptive Audio Rate), or the like. The coding parameters 212 are information indicative of coding ability of the n-th PTT terminal 20-$n$. The coding parameters 212 are, for example, information indicative of a sampling frequency (Sout), a channel number (Chout), and a bit rate (Bout) of the speech coded data. The coding tool (Tout) 213 is information indicative of a coding tool where the speech coded data uses. The coding tool (Tout) 213 is information designating payload option, and so on.

Figure 14:
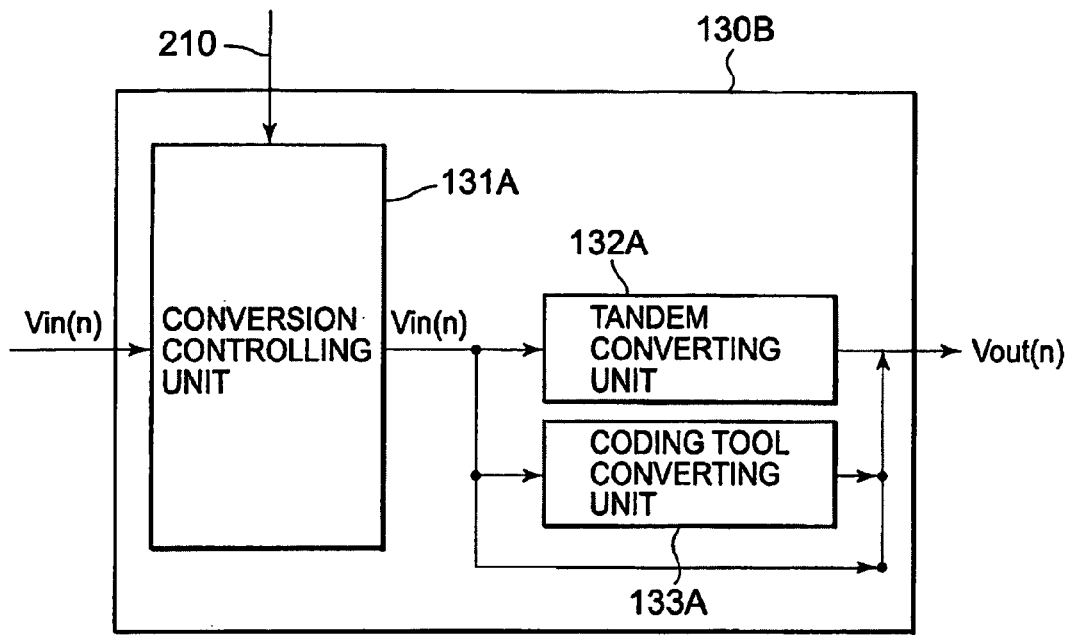
FIG. 14 is a block diagram showing structure of a speech converting unit according to a third exemplary embodiment of this invention.

FIG. 14 shows a detailed construction of the speech converting unit 130B according to the third exemplary embodiment of this invention. The speech converting unit 130B in the third exemplary embodiment comprises a conversion controlling unit 131A, a tandem converting unit 132A, and a coding tool converting unit 133A.

The conversion controlling unit 131A determines a conversion method of the input signal Vin(n) and supplies the input signal Vin(n) with the converting unit corresponding to the determined conversion method. More specifically, the conversion controlling unit 131A compares the coding method, the coding parameters, the coding tool, and so on of the input signal Vin(n) with the connection setting information 210 corresponding to the PTT terminal (the i-th PTT terminal) 20-$i$ for the transmission destination and determines, on the basis of this result, the conversion method for the input signal Vin(n). In this event, the conversion controlling unit 131A selects the conversion method which has the least degradation of quality caused by conversion and has the least amount of processing required to conversion. In addition, when non-conversion is selected in the conversion controlling unit 131A, the conversion controlling unit 131A delivers, to the transmitting unit 140A, the input signal Vin(n) as the output signal Vout(n) as it is.

The tandem converting unit 132A performs K types of cording processing in accordance with the coding method and the coding parameters, where K is a positive integer which is not more than M, namely, K≦M. In the tandem converting unit 132A, a sampling frequency converting method such as a sub-sampling, a method for converting the coding parameters such as re-quantizing, and a channel synthesizing method for converting stereo sound into monophonic sound as conversion of the channel number are adopted.

The coding tool converting unit 133A changes payload option of the input signal Vin(n).

Figure 15:
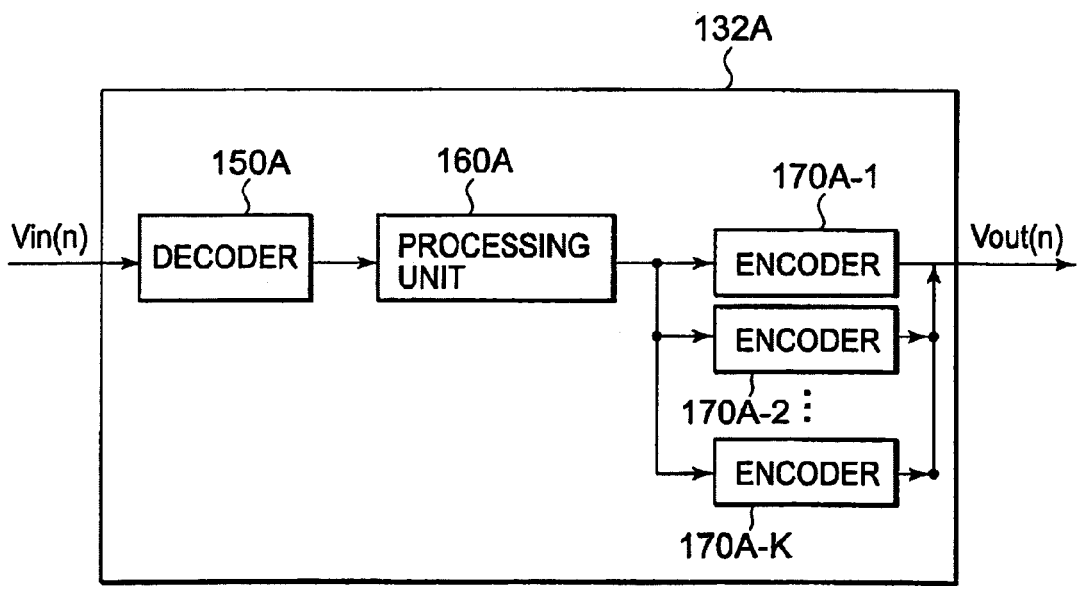
FIG. 15 is a block diagram showing structure of a tandem converting unit according to a third exemplary embodiment of this invention.

FIG. 15 shows structure of the tandem converting unit 132A according to the third exemplary embodiment of this invention. The tandem converting unit 132A according to the third exemplary embodiment comprises a decoder 150A, a processing unit 160A, and first through K-th encoders 170A-1, 170A-2, ..., and 170A-K. The decoder 150A decodes the input signal Vin(n) to produce a decoded signal. The processing unit 160A changes the sampling frequency of the decoded signal into a sampling frequency Sout included in the connection setting information 210 designated by the conversion controlling unit 131A to produce a changed signal. The first through the K-th encoders 170A-1 to 170A-K perform encoding processing of the changed signal in accordance with the coding parameters and the coding method which are preliminarily set.

It will be assumed that the conversion controlling unit 131A selects the tandem conversion. In this event, the conversion controlling unit 131A controls the tandem converting unit 132A on the basis of the comparison result of the connection setting information 210 and designates a sampling frequency in the processing unit 160A and the encoder to be encoded. The tandem converting unit 132A performs encoding in a k-th encoder 170A-$k$ designated to produce an encoded signal as the output signal Vout(n)), where k represents a variable between 1 and K, both inclusive.

Although the tandem converting unit 132A according to the third exemplary embodiment can convert the input signal Vin(n) into the K types of the output signals Vout(n), it is possible to suppress an amount of processing so as to become small because the tandem converting unit 132A comprises only one decoder 150A.

Figure 16:
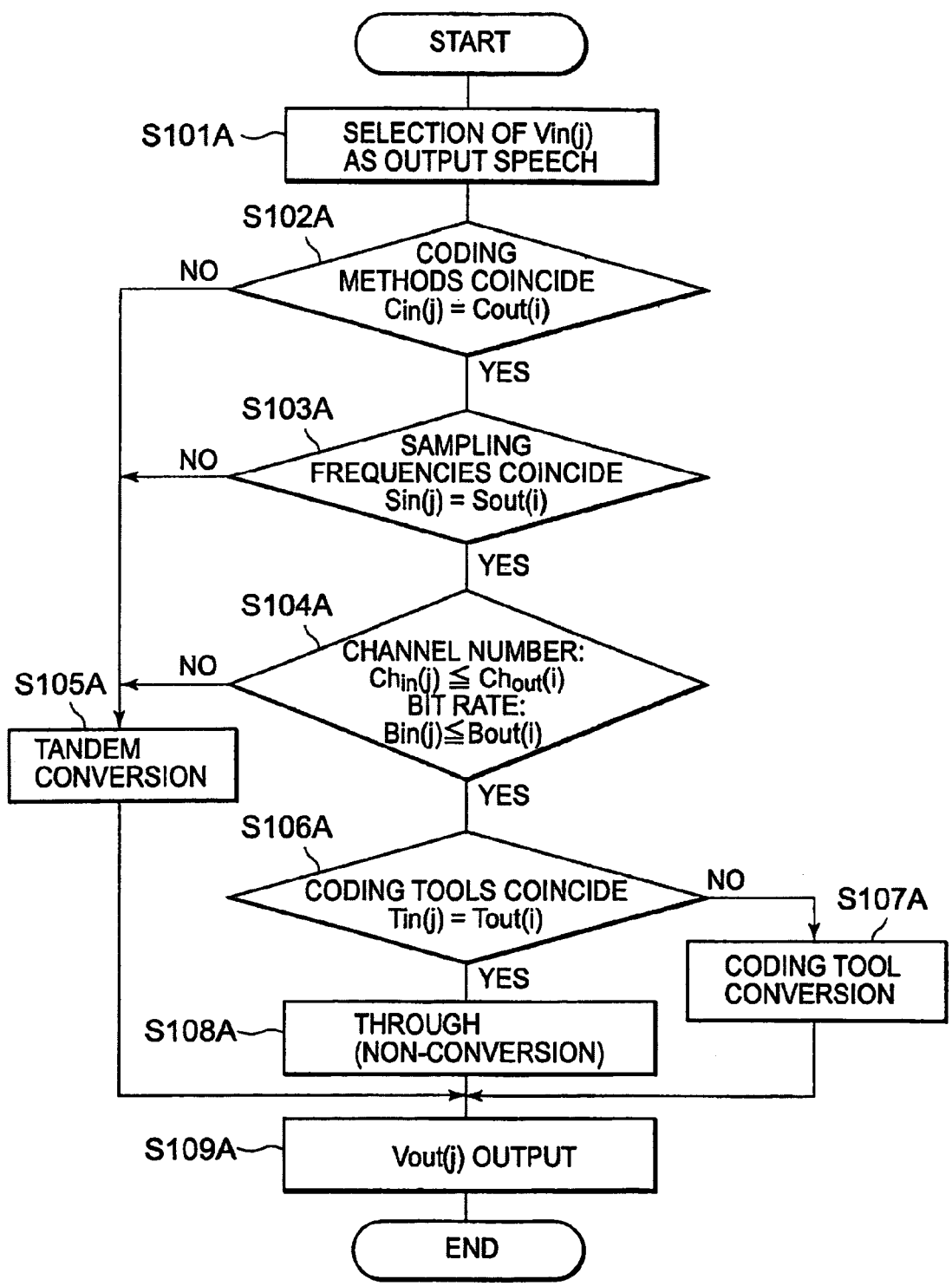
FIG. 16 is a flow chart showing selecting operation of a converting method of the medium coded data in the PTT server according to a third exemplary embodiment of this invention.

Referring now to FIG. 16, the description will proceed to conversion processing in the PTT server 10A in detailed. Herein, the description will be exemplified in a case where, among the first through the N-th PTT terminals 20-1 to 20-N, a j-th PTT terminal 20-$j$ (1≦j≦N) has a speaking right and transmits the speech coded data to an i-th PTT terminal 20-$i$ (1≦i≦N, i≠j). That is, in the example being illustrated, the j-th PTT terminal 20-$j$ acts as the PTT terminal for the transmission source while the i-th PTT terminal 20-$i$ acts as the PTT terminal for the transmission destination.

When an j-th input signal Vin(j) is supplied from the j-th PTT terminal 20-$j$ for the transmission source to the PTT server 10A, the speech converting unit 130B (the conversion controlling unit 131A) obtains the connection setting information 210 corresponding to the i-th PTT terminal 20-$i$ for the transmission destination and carries out comparison processing between them and the coding method, the coding parameters, the coding tool, and so on of the j-th input signal Vin(j) (step S101A). Herein, it will be assumed that a coding method (Cin), a sampling frequency (Sin), a channel number (Chin), a bit rate (Bin), and a coding tool (Tin) of the j-th input signal Vin(j) are represented by a j-th coding method Cin(j), a j-th sampling frequency Sin(j), a j-th channel number Chin(j), a j-th bit rate Bin(j), and a j-th coding tool Tin(j), respectively, while the coding method (Cout), the sampling frequency (Sout), the channel number (Chout), the bit rate (Bout), and the coding tool (Tout) corresponding to the i-th PTT terminal 20-*i* for the transmission destination are represented by an i-th coding method Cout(i), an i-th sampling frequency Sout(i), an i-th channel number Chout(i), an i-th bit rate Bout(i), and an i-th coding tool Tout(i), respectively.

The conversion controlling unit 131A compares the coding method 211 and the coding parameters 212 of the connection setting information 210 corresponding to the i-th PTT terminal 20-*i* for the transmission destination with the coding method and the coding parameters of the j-th input signal Vin(j) and determines whether or not the j-th input signal Vin(j) should be tandem transformed on the basis of its comparison result (steps S102A to S104A). Herein, the conversion controlling unit 131A compares the j-th coding method Cin(j) with the i-th coding method Cout(i), compares the j-th sampling frequency Sin(j) with the i-th sampling frequency Sout(i), compares the j-th channel number Chino(j) with the j-th channel number Chin(i), and compares the bit rate Bin(j) with the i-th bit rate Bout(i). Under the circumstances, when the comparison result is any one where the coding methods (C) do not coincide (NO at the step S102A), the j-th sampling frequency Sin(j) and the i-th sampling frequency Sout(i) do not coincide (NO at the step S103A), the i-th channel number Chout(i) is less than the j-th channel number Chin(j) (NO at the step S104A), or the j-th bit rate Bout(i) is less than the j-th bit rate Bin(j) (NO at the step S104A), the conversion controlling unit 131A selects the tandem conversion.

When the conversion controlling unit 131A selects the tandem conversion in the steps S102A to S104A, the conversion controlling unit 131A delivers the j-th input signal Vin(j) to the tandem converting unit 132A. The tandem converting unit 132A converts, on the basis of the connection setting information 210 corresponding to the i-th PTT terminal 20-*i* for the transmission destination, the coding method or the coding parameters of the j-th input signal Vin(j) into a converted signal (step S105A) and sends the converted signal as a j-th output signal Vout(j) to the transmitting unit 140A (step S109A). Specifically, in the tandem converting unit 132A, the decoder 150A decodes the j-th input signal Vin(j) into a decoded j-th input signal which is supplied to the processing unit 160A. When the j-th sampling frequency Sin(j) of the j-th input signal Vin(j) is higher than the i-th sampling frequency Sout(i) for the transmission destination, the processing unit 160A converts the j-th sampling frequency Sin(j) of the decoded j-th input signal into the i-th sampling frequency Sout(i). When the j-th sampling frequency Sin(j) of the j-th input signal Vin(j) is not higher than the i-th sampling frequency Sout(i) for the transmission destination, the sampling frequency conversion processing is omitted. Subsequently, encoding processing is carried out in the k-th encoder 170-*k* on the basis of the connection setting information 210 corresponding to the i-th PTT terminal 20-*i* for the transmission destination. That it, the j-th input signal Vin(j) after sampling frequency conversion processing is encoded with the i-th coding method Cout(i), the i-th channel number Chout(i), and the i-th bit rate Bout(i) for the transmission destination and an encoded signal is sent to the transmitting unit 140A as the j-th output signal Vout(j).

On the other hand, in comparison processing (the steps S102A to S104A) between the coding method and the coding parameters of the transmission source and them of the transmission destination, when both of coding methods (C) and both of sampling frequency (S) coincide (YES at the step S102A and YES at the step S103A) and when the i-th channel number Chout(i) is not less than the j-th channel number Chin(j) and the i-th bit rate Bout(i) is not less than the j-th bit rate Bin(j) (YES at the step S104A), the conversion controlling unit 131A carries out comparison processing between the coding tools (T) corresponding to the transmission source and to the transmission destination (step S106A). Herein, it is determined whether or not a coding tool conversion processing for the j-th input signal Vin(j) is carried out.

When the j-th coding tool Tin(j) for the transmission source and the i-th coding tool Tout(i) for the transmission destination do not coincide at the step S106A, the conversion controlling unit 131A selects the coding tool conversion and delivers the j-th input signal Vin(j) to the coding tool converting unit 133A. The coding tool converting unit 133A converts the j-th input signal Vin(j) into the j-th output signal Vout(j) using the i-th coding tool Tout(i) by processing similar to prior art.

When both coding tools (T) coincide with each other at the step S106A, the conversion controlling unit 131A selects non-conversion (step S108A) and produces the j-th input signal Vin(j) as the j-th output signal Vout(j) as it is.

In the manner which is described above, the PTT server 10A can convert the j-th speech coded data (the j-th input signal) Vin(j) transmitted from the j-th PTT terminal 20-*j* for the transmission source into data (the j-th output signal) Vout (j) having a coding format matched with encoding ability (decoding ability) of the i-th PTT terminal 20-*i* for the transmission destination. In addition, when the i-th PTT terminal 20-*i* for the transmission destination can decode the j-th speech coded data Vin(j) transmitted from the j-th PTT terminal 20-*j* for the transmission source, the PTT server 10A transmits the j-th speech coded data (the i-th input signal) Vin(j) to the i-th PTT terminal 20-*i* without conversion.

The transmitting unit 140A transmits, on the basis of a port number and an IP address designated by the controlling unit 110A, the j-th output signal Vout(j) produced by the speech converting unit 130B to the i-th PTT terminal 20-*i* for the transmission destination as the speech coded data. When there are a plurality of PTT terminals 20-*n* for transmission destination, the speech converting unit 130B carries out the above-mentioned conversion operation (the steps S101A to S109A) every PTT terminal for the transmission destination and delivers the respective j-th output signals Vout(j) to the transmitting unit 140A. Under the circumstances, the number M (including non-conversion) of the j-th output signals Vout (j) sent to the transmitting unit 140A is less than the number (N−1) of the PTT terminals for the transmission destination. The encoding abilities in the all PTT terminals 20-1 to 20-N belonging to the PTT group are normally not different from one another and in many case there are the PTT terminals having common coding method and common encoding ability. In addition, it is possible to convert the coded data with common coding processing by setting, in the PTT terminal having a high coding ability, the coding parameters 212 matched with the PTT terminal having a low coding ability. As a result, the number of conversion processing for the coded data is determined in accordance with the number M of pieces of the connection setting information 210 set in the PTT server 10A independent of the number N of the PTT terminals belonging to the PTT group. Therefore, the PTT server 10A does not require to carry out conversion processing in accordance with the coding abilities corresponding to the all of PTT terminals of transmission destination and can realize replay processing of the speech coded data with M times of conversion processing.

In the third exemplary embodiment of this invention, the connection setting information 210 may include, as the coding parameters 212, the sampling frequency Sout. In this event, when the coding method of the input medium coded data Vin(n) coincides with the coding method 212 included in the connection setting information 210 compliant with the PTT terminal for the transmission destination and when a sampling frequency of the input medium coded data Vin(n) is different from the sampling frequency Sout included in the connection setting information 210 compliant with the PTT terminal for the transmission destination, the conversion controlling unit 131A delivers the input medium coded data Vin(n) to the tandem converting unit 132A corresponding to the connection setting information 210.

In addition, the tandem converting unit 132A may comprise the processing unit 160A for changing the sampling frequency of the input medium coded data Vin(n) into the sampling frequency Sout included in the connection setting information 210 compliant with the PTT terminal 20-$i$ for the transmission destination.

In addition, the connection setting information 210 may includes, as the coding parameters 212, the channel number Chout and the bit rate Bout. In this event, when the coding method and the sampling frequency of the input medium coded data Vin(n) coincide with the coding method 211 and the sampling frequency Sout included in the connection setting information 210 compliant with the PTT terminal 20-$i$ for the transmission destination and when the channel number and the bit rate of the input medium coded data Vin(n) are more than the channel number Chout and the bit rate Bout included in the connection setting information 210 compliant with the PTT terminal 20-$i$ for the transmission destination, the conversion controlling unit 131A delivers the input medium coded data Vin(n) to the tandem converting unit 132A corresponding to the connection setting information 210.

Furthermore, the connection setting information 210 preferably may include the coding tool 213 where the corresponding PTT terminal 20-$n$ uses for coding. In this event, the medium converting unit 130B preferably may further comprise the coding tool converting unit 133A for converting the input medium coded data Vin(n) with the coding tool 213 included in the connection setting information 210 compliant with the PTT terminal 20-$i$ for the transmission destination into a converted data to deliver, to the transmitting unit 140A, the converted data as the output coded data Vout(n) corresponding to the PTT terminal 20-$i$ for the transmission destination. When the coding tool of the input medium coded data Vin(n) is different from the coding tool 213 corresponding to the PTT terminal 20-$i$ for the transmission destination, the conversion controlling unit 131A delivers the input medium coded data Vin(n) to the coding tool converting unit 133A. When both coincide with each other, the conversion controlling unit 131A delivers the input medium coded data Vin(n) to the transmitting unit 140A as the output coded data Vout(n) corresponding to the transmission destination.

While this invention has thus far been described in conjunction with a few embodiments thereof, it will readily be possible for those skilled in the art to put this invention into practice in various other manners. For example, although description is made as regards on the assumption that the conversion method for entire carrying out the coding tool conversion and the time information conversion is adopted in the first and the second exemplary embodiment, there is no problem even if they are independently carried out.

In addition, although the transmitting unit 140 or 140A transmits, to the PTT terminal 20-$i$, as converted medium coded data, the output signal selected M output signals Vout(n) (including non-conversion) produced by the medium converting unit 130 or 130B in the exemplary embodiments, this invention is not restricted to it. For example, the transmitting unit 140 or 140A may transmit the M output signals Vout(n) to all of PTT terminals 20-$n$ for transmission destination. Each PTT terminal 20-$n$ may obtain, from the M output signals Vout(n), the output signal Vout(n) matched with the connection setting information 200 or 210 notified on call control (on ability conversion).

Furthermore, although description is made as regards on the assumption that the number of connection setting information 200 or 210 prepared in the PTT server 10 or 10A and the number of the connection setting information 200 or 210 assigned to the respective PTT terminals 20-1 to 20-N are equal to M, pieces of the connection setting information 200 or 210 that are not less in number than the number M assigned to the PTT terminal 20-$n$ may be prepared in the PTT server 10 or 10A.

The invention claimed is:

1. A PTT (Push To Talk) server carrying out a PTT communication, said PTT server comprising:
   a receiving unit that receives an input medium coded data from any one of a plurality of PTT terminals which carry out data transmission to said PTT server and which have different specifications;
   a medium converting unit that converts said input medium coded data into a converted data, said medium converting unit producing said converted data as an output coded data;
   a transmitting unit that transmits said output coded data to a PTT terminal for a transmission destination; and
   a controlling unit that controls said receiving unit, said medium converting unit, and said transmitting unit,
   wherein said controlling unit controls pieces of connection setting information which are less in number than said plurality of PTT terminals by complying them with said plurality of PTT terminals,
   wherein said connection setting information includes information identifying coding setting information for said output coded data, and
   wherein said medium converting unit converts said input medium coded data into said converted data with a conversion method on the basis of said connection setting information compliant with said PTT terminal for the transmission destination,
   wherein said connection setting information includes, as said coding setting information, a coding method and coding parameters of said output coded data,
   wherein said medium converting unit comprises:
   a tandem converting unit; and
   a conversion controlling unit that compares a coding method and coding parameters of said input medium coded data with said connection setting information compliant with said PTT terminal for the transmission destination, said conversion controlling unit sending, in accordance with a comparison result, said input medium coded data to said tandem converting unit or said transmitting unit,
   wherein said tandem converting unit comprises:
   a decoder that decodes said input medium coded data to produce a decoded data; and
   an encoder that encodes said decoded data with the coding method and the coding parameters included in the connection setting information compliant with said PTT terminal for the transmission destination into an encoded data said encoder supplying said transmitting unit with said encoded data as said output coded data corresponding to said PTT terminal for the transmission destination, wherein said connection setting information includes, as said coding parameters, an image resolution, a frame rate, and a bit rate, and wherein said conversion controlling unit supplies said input medium coded data to the tandem converting unit corresponding to said connection setting information when a coding method and an image resolution of said input medium coded data coincide with the coding method and the image resolution included in said connection setting information compliant with said PTT terminal for the transmission destination and when a frame rate and a bit rate of said input medium coded data are larger than the frame rate and the bit rate included in said connection setting information compliant with said PTT terminal of the transmission destination.

2. The PTT server as claimed in claim 1, wherein said medium converting unit further comprises a B frame deleting unit that deletes a bidirectionally predictive-coded picture frame from said input medium coded data to produce a deleted medium coded data where the bidirectionally predictive-coded picture frame is deleted from said input medium coded data, wherein said conversion controlling unit supplies said tandem converting unit with the deleted medium coded data when a bit rate of said deleted medium coded data is larger than the bit rate included in said connection setting information compliant with said PTT terminal of the transmission destination.

3. A PTT (Push to Talk) communication system comprising:
a PTT server as claimed claim 1; and
a plurality of PTT terminals connected to said PTT server through a packet communication network.

4. A PTT (Push To Talk) server carrying out a PTT communication, said PTT server comprising:
a receiving unit that receives an input medium coded data from any one of a plurality of PTT terminals which carry out data transmission to said PTT server and which have different specifications;
a medium converting unit that converts said input medium coded data into a converted data said medium converting unit producing said converted data as an output coded data;
a transmitting unit that transmits said output codod data to a PTT terminal for a transmission destination; and
a controlling unit that controls said receiving unit, said medium converting unit, and said transmitting unit,
wherein said controlling unit controls pieces of connection setting information which are less in number than said plurality of PTT terminals by complying them with said plurality of PTT terminals,
wherein said connection setting information includes information identifying coding setting information for said output coded data, and
wherein said medium converting unit converts said input medium coded data into said converted data with a conversion method on the basis of said connection setting information compliant with said PTT terminal for the transmission destination,
wherein said connection setting information includes, as said coding setting information, a coding method and coding parameters of said output coded data,
wherein said medium converting unit comprises:
a tandem converting unit; and
a conversion controlling unit that compares a coding method and coding parameters of said input medium coded data with said connection setting information compliant with said PTT terminal for the transmission destination, said conversion controlling unit sending, in accordance with a comparison result, said input medium coded data to said tandem converting unit or said transmitting unit, wherein said tandem converting unit comprises:
a decoder that decodes said input medium coded data to produce a decoded data; and
an encoder that encodes said decoded data with the coding method and the coding parameters included in the connection setting information compliant with said PTT terminal for the transmission destination into an encoded data, said encoder supplying said transmitting unit with said encoded data as said output coded data corresponding to said PTT terminal for the transmission destination, wherein said connection setting information includes, as the coding parameters, a sampling frequency, and wherein said conversion controlling unit supplies said input medium coded data to the tandem converting unit corresponding to said connection setting information when a coding method of said input medium coded data coincides with the coding method included in said connection setting information compliant with said PTT terminal for the transmission destination and when a sampling frequency of said input medium coded data is different from the sampling frequency included in said connection setting information compliant with said PTT terminal of the transmission destination.

5. The PTT server as claimed in claim 4, wherein said tandem converting unit comprises a processing unit that changes the sampling frequency of said input medium coded data into the sampling frequency included in said connection setting information compliant with said PTT terminal for the transmission destination.

6. The PTT server as claimed in claim 4, wherein said connection setting information includes, as said coding parameters, a channel number and a bit rate,
wherein said conversion controlling unit supplies said input medium coded data to the tandem converting unit corresponding to said connection setting information when a coding method and a sampling frequency of said input medium coded data coincide with the coding method and the sampling frequency included in said connection setting information compliant with said PTT terminal for the transmission destination and when a channel number and a bit rate of said input medium coded data are more than the channel number and the bit rate included in said connection setting information compliant with said PTT terminal of the transmission destination.

7. A PTT (Push To Talk) server carrying out a PTT communication, said PTT server comprising:
a receiving unit that receives an input medium coded data from any one of a plurality of PTT terminals which carry out data transmission to said PTT server and which have different specifications;
a medium converting unit that converts said input medium coded data into a converted data, said medium converting unit producing said converted data as an output coded data;
a transmitting unit that transmits said output coded data to a PTT terminal for a transmission destination; and a controlling unit that controls said receiving unit, said medium converting unit, and said transmitting unit, wherein said controlling unit controls pieces of connection setting information which are less in number than said plurality of PTT terminals by complying them with said plurality of PTT terminals, wherein said connection setting information includes information identifying coding setting information for said output coded data, and wherein said medium converting unit converts said input medium coded data into said converted data with a conversion method on the basis of said connection setting information compliant with said PTT terminal for the transmission destination, wherein said connection setting information includes, as said coding setting information, a coding method and coding parameters of said output coded data, wherein said medium converting unit comprises:

a tandem converting unit; and a conversion controlling unit that compares a coding method and coding parameters of said input medium coded data with said connection setting information compliant with said PTT with a comparison result, said input medium coded data to said tandem converting unit or said transmitting unit, wherein said tandem converting unit comprises:

a decoder that decodes said input medium coded data to produce a decoded data; and encoder that encodes said decoded data with the coding method and the coding parameters included in the connection setting information compliant with said PTT terminal for the transmission destination into an encoded data, said encoder supplying said transmitting unit with said encoded data as said output coded data corresponding to said PTT terminal for the transmission destination, wherein said connection setting information further includes a coding tool where a corresponding PTT terminal uses in coding processing, wherein said medium converting unit further comprises a coding tool converting unit that converts said input medium coded data using the coding tool included in said connection setting information compliant with said PTT terminal for the transmission destination into a converted data, said coding tool converting unit supplying said transmitting unit with the converted data as said output coded data corresponding to said PTT terminal for the transmission destination, and wherein said conversion controlling unit supplies said input medium coded data to said coding tool converting unit when a coding tool of said input medium coded data is different from the coding tool included in said connection setting information compliant with said PTT terminal for the transmission destination, said conversion controlling unit supplying said transmitting unit with said input medium coded data as said output coded data corresponding to said PTT terminal for the transmission destination when both coincide with each other.

8. A PTT (Push to Talk) communication method comprising:

(A) performing, in a controlling unit, call control for accommodating a plurality of PTT terminals having different specifications as a PTT group to hold pieces of connection setting information less than the number of said plurality of PTT terminals with said connection setting information compliant with said plurality of PTT terminals, said connection setting information including information specifying coding setting information for an output coded data;

(B) receiving, in a receiving unit, an input medium coded data from any one of said plurality of PTT terminals;

(C) converting, in a medium converting unit, said input medium coded data with a conversion method on the basis of said connection setting information compliant with a PTT terminal for a transmission destination into a converted data to produce said converted data as said output coded data; and (D) transmitting, from a transmitting unit, said output coded data to said PTT terminal for the transmission destination, wherein said connection setting information includes, as said coding setting information, a coding method and coding parameters of said output coded data, wherein said step (C) comprising:

(c1) comparing, in said conversion controlling unit, a coding method and coding parameters of said input medium coded data with said connection setting information compliant with said PTT terminal for the transmission destination;

(c2) delivering, from said conversion controlling unit, said input medium coded data to a tandem converting unit or said transmitting unit in accordance with a comparison result; and (c3) when said input medium coded data is supplied to said tandem converting unit in said step (c2), decoding, in said tandem converting unit, said input medium coded data into a decoded medium coded data and encoding, in said tandem converting unit, said decoded medium coded data with the coding method and the coding parameters included in said connection setting information compliant with said PTT terminal for the transmission destination into encoded data to deliver said encoded data as the output coded data corresponding to the transmission destination to said transmitting unit, wherein said connection setting information includes, as said coding parameters, an image resolution, a frame rate, and a bit rate, and wherein said step (c2) comprises delivering, from said conversion controlling unit, said input medium coded data to said tandem converting unit corresponding to said connection setting information when a coding method and an image resolution of said input medium coded data coincide with the coding method and the image resolution included in said connection setting information compliant with said PTT terminal for the transmission destination and when a frame rate and a bit rate of said input medium coded data are more than the frame rate and the bit rate corresponding to said PTT terminal for the connection destination.

9. The PTT communication method as claimed in claim 8, wherein said step (c2) further comprises:

deleting, in a B frame deleting unit, a bidirectionally predictive-coded picture frame from said input medium coded data to produce a deleted medium coded data; and delivering, from said conversion controlling unit, the deleted medium coded data to said tandem converting unit when a bit rate of said deleted medium coded data is more than the bit rate included in said connection setting information compliant with said PTT terminal for the transmission destination.

10. A PTT (Push to Talk) communication method comprising:

(A) performing, in a controlling unit, call control for accommodating a plurality of PTT terminals having different specifications as a PTT group to hold pieces of connection setting information less than the number of said plurality of PTT terminals with said connection setting information compliant with said plurality of PTT terminals, said connection setting information including information specifying coding setting information for an output coded data;

(B) receiving, in a receiving unit, an input medium coded data from any one of said plurality of PTT terminals;

(C) converting, in a medium converting unit, said input medium coded data with a conversion method on the basis of said connection setting information compliant with a PTT terminal for a transmission destination into a converted data to produce said converted data as said output coded data; and (D) transmitting, from a transmitting unit, said output coded data to said PTT terminal for the transmission destination, wherein said connection setting information includes, as said coding setting information, a coding method and coding parameters of said output coded data, wherein said step (C) comprising:

(c1) comparing, in said conversion controlling unit, a coding method and coding parameters of said input medium coded data with said connection setting information compliant with said PTT terminal for the transmission destination;

(c2) delivering, from said conversion controlling unit, said input medium coded data to a tandem converting unit or said transmitting unit in accordance with a comparison result; and (c3) when said input medium coded data is supplied to said tandem converting unit in said step (c2), decoding, in said tandem converting unit, said input medium coded data into a decoded medium coded data and encoding, in said tandem converting unit, said decoded medium coded data with the coding method and the coding parameters included in said connection setting information compliant with said PTT terminal for the transmission destination into encoded data to deliver said encoded data as the output coded data corresponding to the transmission destination to said transmitting unit, wherein said connection setting information includes, as said coding parameters, a sampling frequency, and wherein said step (c2) comprises delivering, from said conversion controlling unit, said input medium coded data to said tandem converting unit corresponding to said connection setting information when a coding method of said input medium coded data coincides with the coding method included in said connection setting information compliant with said PTT terminal for the transmission destination and when a sampling frequency of said input medium coded data is different from the sampling frequency included in said connection setting information compliant with said PTT terminal of the transmission destination.

11. The PTT communication method as claimed in claim 10, wherein said step (c3) comprises changing, in said tandem converting unit, the sampling frequency of said input medium coded data into the sampling frequency included in said connection setting information compliant with said PTT terminal for the connection destination.

12. The PTT communication method as claimed in claim 10, wherein said connection setting information includes, as said coding parameters, a channel number and a bit rate, wherein said step (c2) comprises delivering, from said conversion controlling unit, said input medium coded data to said tandem converting unit corresponding to said connection setting information when a coding method and a sampling frequency of said input medium coded data coincide with the coding method and the sampling frequency included in said connection setting information compliant with said PTT terminal for the transmission destination and when a channel number and a bit rate of said input medium coded data are more than the channel number and the bit rate corresponding to said PTT terminal for the transmission destination.

13. A PTT (Push to Talk) communication method comprising:

(A) performing, in a controlling unit, call control for accommodating a plurality of PTT terminals having different specifications as a PTT group to hold pieces of connection setting information less than the number of said plurality of PTT terminals with said connection setting information compliant with said plurality of PTT terminals, said connection setting information including information specifying coding setting information for an output coded data;

(B) receiving, in a receiving unit, an input medium coded data from any one of said plurality of PTT terminals;

(C) converting, in a medium converting unit, said input medium coded data with a conversion method on the basis of said connection setting information compliant with a PTT terminal for a transmission destination into a converted data to produce said converted data as said output coded data; and (D) transmitting, from a transmitting unit, said output coded data to said PTT terminal for the transmission destination, wherein said connection setting information includes, as said coding setting information, a coding method and coding parameters of said output coded data, wherein said step (C) comprising:

(c1) comparing, in said conversion controlling unit, a coding method and coding parameters of said input medium coded data with said connection setting information compliant with said PTT terminal for the transmission destination;

(c2) delivering, from said conversion controlling unit, said input medium coded data to a tandem converting unit or said transmitting unit in accordance with a comparison result; and (c3) when said input medium coded data is supplied to said tandem converting unit in said step (c2), decoding, in said tandem converting unit, said input medium coded data into a decoded medium coded data and encoding, in said tandem converting unit, said decoded medium coded data with the coding method and the coding parameters included in said connection setting information compliant with said PTT terminal for the transmission destination into encoded data to deliver said encoded data as the output coded data corresponding to the transmission destination to said transmitting unit, wherein said connection setting information further includes a coding tool where a corresponding PTT terminal uses in coding processing, wherein said step (C) further comprises converting, in a coding tool converting unit, said input medium coded data with the coding tool included in said connection setting information compliant with said PTT terminal for the transmission destination into a converted data to deliver, to said transmitting unit, said converted data as said output coded data corresponding to said PTT terminal for the transmission destination, and wherein said step (c2) comprises:

delivering, from said conversion controlling unit, said input medium coded data to said coding tool converting unit when a coding tool of said input medium coded data is different from the coding tool included in said connection setting information compliant with said PTT terminal of the transmission destination; and delivering, from said conversion controlling unit, to said transmitting unit, said input medium coded data as said output coded data corresponding to said PTT terminal for the transmission destination when both coincide with each other.

* * * * *